US008300745B2

(12) United States Patent
Guess et al.

(10) Patent No.: US 8,300,745 B2
(45) Date of Patent: *Oct. 30, 2012

(54) ITERATIVE INTERFERENCE CANCELLATION USING MIXED FEEDBACK WEIGHTS AND STABILIZING STEP SIZES

(75) Inventors: Tommy Guess, Lafayette, CO (US);
Michael L McCloud, Boulder, CO (US);
Vijay Nagarajan, Boulder, CO (US);
Gagandeep Singh Lamba, Thornton, CO (US)

(73) Assignee: Rambus Inc., Sunnyvale, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/731,915

(22) Filed: Mar. 25, 2010

(65) Prior Publication Data

US 2010/0220824 A1 Sep. 2, 2010

Related U.S. Application Data

(63) Continuation of application No. 11/452,027, filed on Jun. 13, 2006, now Pat. No. 7,715,508.

(60) Provisional application No. 60/736,204, filed on Nov. 15, 2005.

(51) Int. Cl.
*H03D 1/04* (2006.01)
(52) U.S. Cl. ...................................................... 375/346
(58) Field of Classification Search .................. 375/346, 375/347
See application file for complete search history.

(56) References Cited

U.S. PATENT DOCUMENTS

| 5,271,042 | A | 12/1993 | Borth et al. ................... 375/101 |
| 5,423,045 | A | 6/1995 | Kannan et al. ................ 395/750 |
| 5,467,368 | A | 11/1995 | Takeuchi et al. .............. 375/206 |
| 5,553,062 | A | 9/1996 | Schilling et al. ................ 370/18 |
| 5,568,411 | A | 10/1996 | Batruni .................... 364/724.19 |
| 5,606,560 | A | 2/1997 | Malek et al. .................. 370/347 |
| 5,644,592 | A | 7/1997 | Divsalar et al. ............... 375/206 |
| 5,761,237 | A | 6/1998 | Petersen et al. ............... 375/200 |
| 6,157,685 | A | 12/2000 | Tanaka .......................... 375/148 |

(Continued)

FOREIGN PATENT DOCUMENTS

EP 1179891 2/2002

(Continued)

OTHER PUBLICATIONS

Response to Notice to File Corrected Application Papers dated May 19, 2010 re U.S. Appl. No. 12/731,960. 63 Pages.

(Continued)

*Primary Examiner* — Kevin Kim
(74) *Attorney, Agent, or Firm* — Barcelo, Harrison & Walker LLP

(57) ABSTRACT

A receiver is configured for canceling intra-cell and inter-cell interference in coded, multiple-access, spread-spectrum transmissions that propagate through frequency-selective communication channels. The receiver employs iterative symbol-estimate weighting, subtractive cancellation with a stabilizing step-size, and mixed-decision symbol estimate. Receiver embodiments may be implemented explicitly in software of programmed hardware, or implicitly in standard Rake-based hardware either within the Rake (i.e., at the finger level) or outside the Rake (i.e., at the user of subchannel symbol level).

67 Claims, 16 Drawing Sheets

U.S. PATENT DOCUMENTS

| | | | | |
|---|---|---|---|---|
| 6,161,209 A | 12/2000 | Moher | | 714/780 |
| 6,175,588 B1 | 1/2001 | Visotsky et al. | | 375/148 |
| 6,192,067 B1 | 2/2001 | Toda et al. | | 375/144 |
| 6,208,683 B1 | 3/2001 | Mizuguchi et al. | | 375/140 |
| 6,240,099 B1 * | 5/2001 | Lim et al. | | 370/441 |
| 6,307,901 B1 | 10/2001 | Yu et al. | | 375/341 |
| 6,320,919 B1 | 11/2001 | Khayrallah et al. | | 375/347 |
| 6,404,760 B1 | 6/2002 | Holtzman et al. | | 370/342 |
| 6,414,949 B1 | 7/2002 | Boulanger et al. | | 370/335 |
| 6,426,973 B1 | 7/2002 | Madhow et al. | | 375/231 |
| 6,466,611 B1 | 10/2002 | Bachu et al. | | 375/144 |
| 6,496,534 B1 | 12/2002 | Shimizu et al. | | 375/147 |
| 6,522,683 B1 | 2/2003 | Smee et al. | | 375/144 |
| 6,529,495 B1 | 3/2003 | Aazhang et al. | | 370/342 |
| 6,535,554 B1 | 3/2003 | Webster et al. | | 375/233 |
| 6,546,043 B1 | 4/2003 | Kong | | 375/148 |
| 6,570,864 B1 * | 5/2003 | Kim et al. | | 370/342 |
| 6,570,919 B1 | 5/2003 | Lee | | 375/233 |
| 6,594,318 B1 | 7/2003 | Sindhushayana | | 375/262 |
| 6,594,618 B1 | 7/2003 | Azencott | | 702/182 |
| 6,647,078 B1 | 11/2003 | Thomas et al. | | 375/349 |
| 6,678,508 B1 | 1/2004 | Koinpillai et al. | | 455/132 |
| 6,687,723 B1 | 2/2004 | Ding | | 708/322 |
| 6,690,723 B1 | 2/2004 | Gose et al. | | 375/233 |
| 6,711,219 B2 | 3/2004 | Thomas | | 375/346 |
| 6,714,585 B1 | 3/2004 | Wang et al. | | 375/148 |
| 6,724,809 B2 | 4/2004 | Reznik | | 375/148 |
| 6,741,634 B1 | 5/2004 | Kim et al. | | 375/144 |
| 6,754,340 B1 | 6/2004 | Ding | | 379/406.08 |
| 6,816,541 B1 | 11/2004 | Schmidl | | 375/148 |
| 6,839,390 B2 | 1/2005 | Mills | | 375/341 |
| 6,850,772 B2 | 2/2005 | Mottier | | 455/526 |
| 6,909,742 B1 | 6/2005 | Leonosky | | 375/232 |
| 6,912,250 B1 | 6/2005 | Adireddy et al. | | 375/232 |
| 6,931,052 B2 | 8/2005 | Fuller et al. | | 375/144 |
| 6,947,481 B1 | 9/2005 | Citta et al. | | 375/232 |
| 6,947,506 B2 | 9/2005 | Mills | | 375/346 |
| 6,956,893 B2 | 10/2005 | Frank et al. | | 375/147 |
| 6,959,065 B2 | 10/2005 | Sparrman et al. | | 376/349 |
| 6,963,546 B2 | 11/2005 | Misra et al. | | 370/294 |
| 6,975,669 B2 | 12/2005 | Ling et al. | | 375/141 |
| 6,975,671 B2 | 12/2005 | Sindhushayana et al. | | 375/144 |
| 6,986,096 B2 | 1/2006 | Chaudhuri et al. | | 714/780 |
| 6,993,070 B1 | 1/2006 | Berthet et al. | | 675/232 |
| 6,996,385 B2 | 2/2006 | Messier et al. | | 455/226.3 |
| 7,020,175 B2 | 3/2006 | Frank | | 375/130 |
| 7,035,316 B2 | 4/2006 | Smee et al. | | 375/147 |
| 7,035,354 B2 | 4/2006 | Karnin et al. | | 375/341 |
| 7,039,095 B2 | 5/2006 | Takahashi | | 375/148 |
| 7,042,929 B2 | 5/2006 | Pan et al. | | 375/148 |
| 7,051,268 B1 | 5/2006 | Sindhushayana et al. | | 714/786 |
| 7,054,354 B2 | 5/2006 | Gorokhov et al. | | 375/148 |
| 7,069,050 B2 | 6/2006 | Yoshida | | 455/561.2 |
| 7,072,628 B2 | 7/2006 | Agashe et al. | | 455/140 |
| 7,092,464 B2 | 8/2006 | Mills | | 375/346 |
| 7,133,435 B2 | 11/2006 | Papasakellariou et al. | | 375/148 |
| 7,209,511 B2 | 4/2007 | Dent | | 375/148 |
| 7,298,805 B2 | 11/2007 | Walton et al. | | 375/347 |
| 7,397,843 B2 | 7/2008 | Grant et al. | | 375/148 |
| 7,535,969 B2 | 5/2009 | Catreux et al. | | 375/267 |
| 7,623,602 B2 | 11/2009 | Guess et al. | | 375/347 |
| 7,711,075 B2 | 5/2010 | Guess et al. | | 375/346 |
| 7,733,941 B2 | 6/2010 | McCloud | | 375/148 |
| 7,826,516 B2 | 11/2010 | Guess et al. | | 375/148 |
| 2001/0017883 A1 | 8/2001 | Tiirola et al. | | 375/148 |
| 2001/0053143 A1 | 12/2001 | Li et al. | | 370/344 |
| 2002/0009156 A1 | 1/2002 | Hottinen et al. | | 375/267 |
| 2002/0060999 A1 | 5/2002 | Ma et al. | | 370/335 |
| 2002/0118781 A1 | 8/2002 | Thomas et al. | | 375/347 |
| 2002/0131534 A1 | 9/2002 | Ariyoshi et al. | | 375/346 |
| 2002/0154717 A1 | 10/2002 | Shima et al. | | 375/349 |
| 2002/0159507 A1 | 10/2002 | Flaig et al. | | 375/148 |
| 2003/0005009 A1 | 1/2003 | Usman | | 708/322 |
| 2003/0012264 A1 | 1/2003 | Papasakellariou et al. | | 375/148 |
| 2003/0035469 A1 | 2/2003 | Frank et al. | | 375/150 |
| 2003/0086479 A1 | 5/2003 | Naguib | | 375/144 |
| 2003/0095590 A1 | 5/2003 | Fuller et al. | | 375/148 |
| 2003/0156630 A1 | 8/2003 | Sriram et al. | | 375/148 |
| 2003/0210667 A1 | 11/2003 | Zhengdi | | 370/335 |
| 2003/0219085 A1 | 11/2003 | Endres et al. | | 375/350 |
| 2004/0001537 A1 | 1/2004 | Zhang et al. | | 375/229 |
| 2004/0008765 A1 | 1/2004 | Chung et al. | | 375/233 |
| 2004/0013190 A1 | 1/2004 | Jayaraman et al. | | 375/233 |
| 2004/0076224 A1 | 4/2004 | Onggosanusi et al. | | 375/144 |
| 2004/0095907 A1 | 5/2004 | Agee et al. | | 340/334 |
| 2004/0116078 A1 | 6/2004 | Rooyen et al. | | 455/101 |
| 2004/0146024 A1 | 7/2004 | Li et al. | | 370/334 |
| 2004/0161065 A1 | 8/2004 | Buckley et al. | | 375/350 |
| 2004/0165675 A1 | 8/2004 | Ito et al. | | 375/267 |
| 2004/0190601 A1 | 9/2004 | Papadimitriou et al. | | 375/148 |
| 2004/0196892 A1 | 10/2004 | Reznik | | 375/148 |
| 2004/0248515 A1 | 12/2004 | Molev Shteiman | | 455/63.1 |
| 2004/0264552 A1 | 12/2004 | Smee et al. | | 375/147 |
| 2005/0002445 A1 | 1/2005 | Dunyak et al. | | 375/148 |
| 2005/0013349 A1 | 1/2005 | Chae et al. | | 375/148 |
| 2005/0084045 A1 | 4/2005 | Stewart et al. | | 375/350 |
| 2005/0101259 A1 | 5/2005 | Tong et al. | | 455/69 |
| 2005/0111408 A1 | 5/2005 | Skillermark et al. | | 370/331 |
| 2005/0129107 A1 | 6/2005 | Park et al. | | 375/233 |
| 2005/0152267 A1 | 7/2005 | Song et al. | | 370/210 |
| 2005/0157811 A1 | 7/2005 | Bjerke et al. | | 375/267 |
| 2005/0163196 A1 | 7/2005 | Currivan et al. | | 375/144 |
| 2005/0180364 A1 | 8/2005 | Nagarajan | | 370/335 |
| 2005/0185729 A1 | 8/2005 | Mills | | 341/50 |
| 2005/0190868 A1 | 9/2005 | Khandekar et al. | | 375/346 |
| 2005/0195889 A1 | 9/2005 | Grant et al. | | 375/148 |
| 2005/0213529 A1 | 9/2005 | Chow et al. | | 370/320 |
| 2005/0223049 A1 | 10/2005 | Regis | | 708/300 |
| 2005/0243908 A1 | 11/2005 | Heo et al. | | 375/233 |
| 2005/0259770 A1 | 11/2005 | Chen | | 348/346 |
| 2005/0265465 A1 | 12/2005 | Hosur et al. | | 375/260 |
| 2006/0007895 A1 | 1/2006 | Coralli et al. | | 370/335 |
| 2006/0013289 A1 | 1/2006 | Hwang | | 375/148 |
| 2006/0047842 A1 | 3/2006 | McElwain | | 709/231 |
| 2006/0078042 A1 | 4/2006 | Lee et al. | | 375/148 |
| 2006/0125689 A1 | 6/2006 | Narayan et al. | | 375/347 |
| 2006/0126703 A1 | 6/2006 | Karna | | 375/147 |
| 2006/0141933 A1 | 6/2006 | Smee et al. | | 455/63.1 |
| 2006/0141934 A1 | 6/2006 | Pfister et al. | | 455/63.1 |
| 2006/0141935 A1 | 6/2006 | Hou et al. | | 455/63.1 |
| 2006/0142041 A1 | 6/2006 | Tomasin et al. | | 455/522 |
| 2006/0153283 A1 | 7/2006 | Scharf | | 375/148 |
| 2006/0215781 A1 | 9/2006 | Lee et al. | | 375/267 |
| 2006/0227909 A1 | 10/2006 | Thomas et al. | | 375/346 |
| 2006/0229051 A1 | 10/2006 | Narayan et al. | | 455/296 |
| 2006/0245509 A1 | 11/2006 | Khan et al. | | 375/260 |
| 2007/0153935 A1 | 7/2007 | Yang et al. | | 375/267 |

FOREIGN PATENT DOCUMENTS

| | | |
|---|---|---|
| WO | 01/89107 | 11/2001 |
| WO | 02/080432 | 10/2002 |

OTHER PUBLICATIONS

Response to Non-Final Office Action dated May 13, 2010 re U.S. Appl. No. 11/491,674 with Information Disclosure Statement includes references and Terminal Disclaimer. 109 Pages.

Wang, Xiaodong et al., "Space-Time Multiuser Detection in Multipath CDMA Channels", IEEE Transactions on Signal Processing, vol. 47, No. 9, Sep. 1999, pp. 2356-2374. 19 Pages.

Marinkovic, Slavica et al., "Space-Time Iterative and Multistage Receiver Structures for CDMA Mobile Communications Systems", IEEE Journal on Selected Areas in Communications, vol. 19, No. 8, Aug. 2001 pp. 1594-1604.11 Pages.

Jayaweera, Sudharman K. et al., "A RAKE-Based Iterative Receiver for Space-Time Block-Coded Multipath CDMA", IEEE Transactions on Signal Processing, vol. 52, No. 3, Mar. 2004 pp. 796-806. 11 Pages.

Mohamed, Nermin A. et al., "A Low-Complexity Combined Antenna Array and Interference Cancellation DS-CDMA Receiver in Multipath Fading Channels", IEEE Journal on Selected Areas in Communications, vol. 20, No. 2, Feb. 2002. pp. 248-256. 9 Pages.

Information Disclosure Statement re U.S. Appl. No. 11/491,674 submitted May 13, 2010. 2 Pages.

Response submitted May 12, 2010 to Notice to File corrected Application Papers mailed Apr. 7, 2010 re U.S. Appl. No. 12/731,915. 99 Pages.
Guo, Dongning, Rasmussen, Lars K., and Lim, Teng Joon, "Linear Parallel Interference Cancellation in Long-Code CDMA," IEEE Journal on Selected Areas in Communications, Dec. 1999, pp. 2074-2081, vol. 17, No. 12. 8 pages.
Guo, Dongning, Rasmussen, Lars K., Sun, Sumei, Lim, Teng J., and Cheah, Christopher, "MMSE-Based Linear Parallel Interference Cancellation in CDMA," IEEE Proceedings, Spread Spectrum Techniques and Appl. 0-7803-4281-X/97, Sep. 1998, pp. 917-921. 5 pages.
Rasmussen, Lars K. and Oppermann, Ian J., "Convergence Behaviour of Linear Parallel Cancellation in CDMA," IEEE Global Telecom. Conf. (San Antonio, Texas), Dec. 2001, pp. 3148-3152. 5 pages.
Guo, Dongning, Rasmussen, Lars K., Sun, Sumei, and Lim, Teng J., "A Matrix-Algebraic Approach to Linear Parallel Interference Cancellation in CDMA," IEEE Transactions on Communications, Jan. 2000, pp. 152-161, vol. 48, No. 1. 10 pages.
Rasmussen, Lars K. and Oppermann, Ian J., "Ping-Pong Effects in Linear Parallel Interference Cancellation for CDMA," IEEE Transactions on Wireless Communications, Mar. 2003, pp. 357-363, vol. 2, No. 2. 7 pages.
Lin, Tao and Rasmussen, Lars K., "Iterative Multiuser Decoding with Maximal Ratio Combining," Australian Workshop on Communication Theory, (Newcastle, Australia), Feb. 2004, pp. 42-46. 6 pages.
Lin, Tao and Rasmussen, Lars K., "Truncated Maximal Ratio Combining for Iterative Multiuser Decoding," Australian Workshop on Communication Theory, (Brisbane, Australia), Feb. 2005. 6 pages.
Wang, Xiaodong and Poor, H. Vincent, "Iterative (Turbo) Soft Interference Cancellation and Decoding for Coded CDMA," IEEE Transactions on Communications, Jul. 1999, pp. 1046-1061, vol. 47, No. 7. 16 pages.
Divsalar, Dariush, Simon, Marvin K., and Raphaeli, Dan, "Improved Parallel Interference Cancellation for CDMA," IEEE Transactions on Communications, Feb. 1998, pp. 258-268, vol. 46., No. 2. 11 pages.
Ali-Hackl, Markus, Freisleben, Stefan, Heddergott, Ralf, and Xu, Wen, "Error Vector Magnitude as a Figure of Merit for CDMA Receiver Design," The 5th European Wireless Conference, Jun. 2009. 7 pages.
Nagasawa, A. et al., "A Novel Backlight System With the Unified Component", IDW/AD '2005, vol. 12th, No. vol. 2, pp. 1285-1288. 4 pages.
Xue, Guoqiang, Weng, Jianfeng, Le-Ngoc, Tho, Tahar, Sofiene, "Adaptive Multistage Parallel Interference Cancellation for CDMA over Multipath Fading Channels," IEEE Journal on Selected Areas in Communications, Oct. 1999, vol. 17, No. 10. 13 pages.
Hooli, Kari, Juntti, Markku, Heikkila, Markku J., Komulainen, Petri, Latva-Aho, Matti, Lilleberg, Jorma, "Chip-Level Channel Equalization in WCDMA Downlink," EURASIP Journal on Applied Signal Processing 2002:8, pp. 757-770. 14 pages.
Rasmussen, Lars K., Lim, Teng J., Johansson, Ann-Louise, "A Matrix-Algebraic Approach to Successive Interference Cancellation in CDMA," IEEE Transactions on Communications, Jan. 2000, vol. 48, No. 1, pp. 145-151. 7 pages.
Tan, Peng H. and Rasmussen, Lars H., "Linear Interference Cancellation in CDMA Based on Iterative Techniques for Linear Equation Systems," IEEE Transactions on Communications, Dec. 2000, vol. 48, No. 12, pp. 2099-2108. 10 pages.
Yener, Aylin, Yates, Roy D., and Ulukus, Sennur, "CDMA Multiuser Detection: A Nonlinear Programming Approach," IEEE Transactions on Communications, Jun. 2002, vol. 50, No. 6, pp. 1016-1024. 9 pages.
Persson, Anders, Ottosson, Tony, and Strom, Erik, "Time-Frequency Localized CDMA for Downlink Multi-Carrier Systems," IEEE 7th Int. Symp. on Spread-Spectrum Tech. & Appl., Sep. 2-5, 2002, vol. 1, pp. 118-122. 5 pages.
Ping, He, Tjhung, Tjeng Thiang, Rasmussen, Lars K., "Decision-Feedback Blind Adaptive Multiuser Detector for Synchronous CDMA System," IEEE Transactions on Vehicular Technology, Jan. 2000, vol. 49, No. 1, pp. 159-166. 8 pages.

Dai, Huaiyu and Poor, H. Vincent, "Iterative Space-Time Processing for Multiuser Detection in Multipath CDMA Channels," IEEE Transactions on Signal Processing, Sep. 2002, vol. 50, No. 6, pp. 2116-2127. 12 pages.
Guo, Yuanbin, "Advanced MIMO-CDMA Receiver for Interference Suppression: Algorithms, System-on-Chip Architectures and Design Methodology," PhD Theisis, Rice University, May 2005, pp. 165-186. 27 pages.
Naidu, Prabhakar S., "Modern Digital Signal Processing: An Introduction," Alpha Science International Ltd., UK, Copyright 2003, pp. 124-126. 6 pages.
Response dated Jan. 5, 2010 re Notice of Non-Compliant Amendment re U.S. Appl. No. 11/451,685. 2 Pages.
Amendment and Response to Office Action with mail date of Jun. 4, 2009 re U.S. Appl. No. 11/451,685, submitted on Nov. 29, 2009. 17 pages.
Response with mail date of Jun. 4, 2009, re U.S. Appl. No. 11/451,685, includes Notice of References and Information Disclosure Statement. 36 pages.
PCT Notification of Transmittal of International Search Report and Written Opinion of International Searching Authority date of mailing Sep. 21, 2007, re Int'l Application No. PCT/US 06/36018. 10 pages.
Non-Final Office Action with mail date of Mar. 23, 2009 for U.S. Appl. No. 11/451,688 includes Notice of References and Information Disclosure Statement. 15 pages.
Non-Final Office Action with mail date of Apr. 3, 2009 for U.S. Appl. No. 11/451,932 includes Notice of References Cited and Information Disclosure Statement. 15 pages.
International Search Report, dated Apr. 26, 2007, in PCT Application No. US06/42036. 2 pages.
Nambiar, Rajiv and Goldsmith, Andrea, "Iterative Weighted Interference Cancellation for CDMA Systems with RAKE Reception," Feb. 1999 IEEE 49th, vol. 2, pp. 1232-1236. 5 pages.
Bejide, Emmanuel O. and Takawira, F., "An Iterative Multiuser Detector for DS-CDMA Systems in Multipath Fading Channels," IEEE Communications Society, Mar. 2004, pp. 54-59. 6 pages.
Notification of Transmittal of International Search Report and Written Opinion of the International Searching Authority with mail date of Apr. 26, 2007 re PCT/US2006/042036 filed on Oct. 30, 2006, with documents citations. 3 pages.
Information Disclosure Statement submitted Sep. 11, 2006 for U.S. Appl. No. 11/452,027, filed Jun. 13, 2006. 9 Pages.
Proakis, John G., "Digital Communications," McGraw-Hill, 4th edition, 2000, pp. 622-626, 956-959. 10 pages.
Verdu, Sergio, "Multiuser Detection," Cambridge University Press, New York, NY, 1998, pp. 291-306. 18 pages.
Kim, Seong Rag, Choi, In-Kyeong, Kang, Sugbong, Lee, Jeong Goo, "Adaptive Weighted Parallel Interference Cancellation for CDMA Systems," Electronic Letters, Oct. 29, 1998, V34, No. 22. 2 pages.
Response to Office Action Summary dated Jun. 29, 2006, mail date Jun. 11, 2009 re U.S. Appl. No. 11/479,401. 9 pages.
Information Disclosure Statement submitted Nov. 21, 2007 for U.S. Appl. No. 11/475,458, filed Aug. 28, 2006. 3 pages.
Response to Office Action Summary dated Jun. 27, 2006, mail date Aug. 17, 2009, re U.S. Appl. No. 11/475,458. 14 pages.
Sayed, Ali H., "Fundamentals of Adaptive Filtering," John Wiley & Sons, Inc. Hoboken, NJ, Jun. 2003, pp. 170-171, 174, 187. 7 pages.
Office Action with mail date of Sep. 28, 2010, re U.S. Appl. No. 12/731,960. 7 pages.
Office Action with mail date of Aug. 30, 2010, re U.S. Appl. No. 12/731,779. 5 pages.
Office Action with mail date of Aug. 30, 2010, re U.S. Appl. No. 12/769,510. 4 pages.
Notice of Allowance and Fee(s) due with mail date Nov. 5, 2010, re U.S. Appl. No. 11/451,685. 11 Pages.
Non Final Office Action dated Dec. 15, 2009 re U.S. Appl. No. 11/491,674, filed Jul. 24, 2006. 7 Pages.
Non Final Office Action dated Jun. 4, 2009 re U.S. Appl. No. 11/451,685, filed Jun. 13, 2006. 2 Pages.
Non Final Office Action dated Jun. 11, 2009 re U.S. Appl. No. 11/479,401, filed Jun. 29, 2006. 6 Pages.
Non Final Office Action dated Aug. 17, 2009 re U.S. Appl. No. 11/475,458, filed Aug. 28, 2006. 13 Pages.

Notice of Appeal submitted Feb. 23, 2010 by Appellant(s) on Jan. 27, 2010 re U.S. Appl. No. 10/993,046. 43 Pages.
Notice of Allowance and Fee(s) Due with mail date of Mar. 21, 2011 re U.S. Appl. No. 11/451,685. 12 Pages.
Preliminary Amendment dated Mar. 30, 2011 re U.S. Appl. No. 12/731,915. 19 Pages.
Office Action dated Jun. 28, 2011 for U.S. Appl. No. 11/451,685 re signed and dated Form 1449. 2 Pages.

Office Action dated Jun. 23, 2011 re U.S. Appl. No. 12/916,389. 16 Pages.
PCT Preliminary Report on Patentability dated May 20, 2008 for PCT/US2006/42036 filed on Oct. 30, 2006. 2 pages.
PCT Preliminary Report on Patentability dated Mar. 26, 2008 for Int'l Application No. PCT/US2006/36018 includes Written Opinion. 5 Pages.

* cited by examiner

ITERATIVE INTERFERENCE CANCELLATION USING MIXED FEEDBACK WEIGHTS AND STABILIZING STEP SIZES

CROSS-REFERENCE TO RELATED APPLICATIONS

This application is a continuation of U.S. patent application Ser. No. 11/452,027, filed Jun. 13, 2006, and entitled "Iterative Interference Cancellation Using Mixed Feedback Weights and Stabilizing Step Sizes", now U.S. Pat. No. 7,715,508; which claims priority to Provisional U.S. Pat. Appl. Ser. No. 60/736,204, filed Nov. 15, 2005, and entitled "Iterative Interference Cancellation Using Mixed Feedback Weights and Stabilizing Step Sizes," all of which are incorporated by reference herein in their entirety. The following are related applications, which were incorporated by reference in Provisional U.S. Pat. Appl. Ser. No. 60/736,204: (1) U.S. patent application Ser. No. 11/100,935, filed Apr. 7, 2005, entitled "Construction of Projection Operators for Interference Cancellation," and published as U.S. Patent Application Publication Number 2005-0180364 A1, which incorporates by reference and is a Continuation-in-Part of (a) U.S. patent application Ser. No. 11/773,777, entitled "Systems and Methods for Parallel Signal Cancellation," and filed on Feb. 6, 2004, now U.S. Pat. No. 7,394,879; (b) U.S. patent application Ser. No. 10/686,359, entitled "Systems and Methods for Adjusting Phase," and filed Oct. 15, 2003, now U.S. Pat. No. 7,068,706; (c) U.S. patent application Ser. No. 10/686,829, entitled "Method and Apparatus for Channel Amplitude Estimation and Interference Vector Construction," and filed on Oct. 15, 2003, now U.S. Pat. No. 7,580,448; (d) U.S. patent application Ser. No. 10/294,834, entitled "Construction of an Interference Matrix for a Coded Signal Processing Engine," and filed on Nov. 15, 2002, now U.S. Pat. No. 7,200,183; and (e) U.S. patent application Ser. No. 10/247,836, entitled "Serial Cancellation Receiver Design for a Coded Signal Processing Engine," and filed on Sep. 20, 2002, now U.S. Pat. No. 7,158,559 (2) U.S. patent application Ser. No. 11/233,636, filed Sep. 23, 2005, entitled "Optimal Feedback Weighting for Soft-Decision Cancellers," and published as U.S. Patent Application Publication Number 2006-0227909 A1; and (3) U.S. patent application Ser. No. 11/266,928, filed Nov. 4, 2005, entitled "Soft Weighted Subtractive Cancellation for CDMA Systems," now U.S. Pat. No. 7,876,810; the entirety of each of the foregoing patents, patent applications, and patent application publications is incorporated by reference herein.

BACKGROUND

1. Field of the Invention

The present invention relates generally to iterative interference cancellation in received wireless communication signals and, more particularly, to cancellation of intra-cell interference and/or inter-cell interference in coded spread spectrum communication systems.

2. Discussion of the Related Art

In an exemplary wireless multiple-access system, a communication resource is divided into code-space subchannels that are allocated to different users. A plurality of sub channel signals received by a wireless terminal (e.g., a subscriber unit or a base station) may correspond to different users and/or different sub channels allocated to a particular user.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates received signals into subchannels in order to differentiate between users.

In a multipath environment, received signals are superpositions of time-delayed and complex-scaled versions of the transmitted signals. Multipath can cause several types of interference. Intra-channel interference occurs when the multipath time-delays cause subchannels to leak into other subchannels. For example, in a forward link, subchannels that are orthogonal at the transmitter may not be orthogonal at the receiver. When multiple base stations (or sectors or cells) are active, there may also be inter-channel interference caused by unwanted signals received from other base stations. Each of these types of interference can degrade communications by causing a receiver to incorrectly decode received transmissions, thus increasing a receiver's error floor. Interference may also have other deleterious effects on communications. For example, interference may lower capacity in a communication system, decrease the region of coverage, and/or decrease maximum data rates. For these reasons, a reduction in interference can improve reception of selected signals while addressing the aforementioned limitations due to interference.

These interferences take the following form when code division multiplexing is employed for a communication link, either with code division multiple access (as used in CDMA 2000, WCDMA, and related standards) or with time division multiple access (as used in EV-DO and related standards). A set of symbols is sent across a common time-frequency slot of the physical channel and separated using a set of distinct code waveforms, which are usually chosen to be orthogonal (or pseudo-orthogonal for reverse-link transmissions). The code waveforms typically vary in time, and these variations are introduced by a pseudo-random spreading code (PN sequence). The wireless transmission medium is characterized by a time-varying multipath profile that causes multiple time-delayed replicas of the transmitted waveform to be received, each replica having a distinct amplitude and phase due to path loss, absorption, and other propagation effects. As a result, the received code set is no longer orthogonal The code space suffers from intra-channel interference within a base station as well as inter-channel interference arising from transmissions in adjacent cells.

The most basic receiver architecture employed to combat these various effects is the well-known Rake receiver. The Rake receiver uses a channel-tracking algorithm to resolve the received signal energy onto various multipath delays. These delayed signals are then weighted by the associated complex channel gains (which may be normalized by path noise powers) and summed to form a single resolved signal, which exploits some of the path diversity available from the multipath channel. It is well known that the Rake receiver suffers from a significant interference floor, which is due to both self-interference from the base station of interest (or base stations, when the mobile is in a soft-handoff base station diversity mode) and multiple-access interference from all base stations in the coverage area. This interference limits the maximum data rates achievable by the mobiles within a cell and the number of mobiles that can be supported in the cell.

Advanced receivers have been proposed to overcome the limitations of the Rake receiver. The optimal multi-user detector (MUD) has the best performance, but is generally too computationally complex to implement. MUD complexity increases exponentially with respect to the total number of active sub channels across the cell of interest and the interfering cells as well as the constellation size(s) of the subchannels. This complexity is so prohibitive that even efficient implementations based on the Viterbi algorithm cannot make it manageable in current hardware structures. Another approach is a properly designed linear receiver, which in many channel scenarios, is able to retain much of the optimal MUD performance, but with a complexity that is polynomial in the number of subchannels. The most common examples are the linear minimum mean squared error (LMMSE) receiver and the related decorrelating (or zero-forcing) receiver, which both require finding, or approximating, the inverse of a square matrix whose dimension is equal to the lesser between the number of active sub channels and the length (in samples) of the longest spreading code.

Complexity can still be prohibitive with these receivers, because such a matrix inverse needs to be calculated (or approximated) for each symbol. These receivers depend not only on the spectral characteristics of the multipath fading channel (which could be slowly time varying), but also on the time-varying spreading codes employed on the subchannels over each symbol. Thus, these receivers vary at the symbol rate even if the channel varies much more slowly.

An alternative approach currently under development for advance receivers sidesteps the need to invert a matrix for each symbol. It accomplishes this by employing a PN-averaged LMMSE (PNA-LMMSE) receiver that assumes the PN code is random and unknown at the receiver (at least for determining the correlation matrix). While this receiver is generally inferior to the LMMSE approach, it has the advantage of not having to be implemented directly, because it is amenable to adaptive (or partially adaptive) implementations. The advantages of an adaptive implementation over a direct implementation include reduced complexity and the fact that the additive noise power (i.e., background RF radiation specific to the link environment, noise in the receiver's RF front end, and any processing noise such as noise due to quantization and imperfect filtering) does not have to be estimated. However, these advantages incur the costs associated with adaptive filters (e.g., performance and adaptation rate). Note that a direct implementation without knowledge of the noise power modifies the LMMSE and PNALMMSE receivers into the corresponding decorrelating (or zero-forcing) receivers that arise from taking the background noise power to be zero when deriving the LMMSE and PNA-MMSE receivers.

Another method for further reducing complexity is to iteratively approximate the matrix-inverse functionality of the LMMSE receiver without explicitly calculating the inverse. Receivers of this type employ multistage interference cancellation. One particular type is known as parallel interference cancellation (PIC), and is motivated by well-known iterative techniques of quadratic minimization. In each stage of PIC, the data symbols of the sub channels are estimated. For each sub channel, an interference signal from the other subchannels is synthesized, followed by interference cancellation that subtracts the synthesized interference from each sub channel. The interference-cancelled subchannels are then fed to a subsequent PIC stage. Ideally, within just a few stages (i.e., before the complexity grows too large), the performance rivals that of the full linear receiver using a matrix inverse.

PIC can be implemented in various modes depending on what types of symbol estimates are used for interference cancellation. In a soft-cancellation mode, PIC does not exploit additional information inherent in the finite size of user constellations. That is, estimates of data symbols are not quantized to a constellation point when constructing interference signals. However, in some multiple-access schemes, the user constellations may be known (e.g., in an EV-DO link or in a WCDMA link without HSDPA users) or determined through a modulation classifier. In such cases, it is possible for PIC to be implemented in a hard-cancellation mode. That is, estimates of data symbols are quantized to constellation points (i.e., hard decisions) when constructing the interference signal.

In a mixed-cancellation mode, PIC employs a soft decision on each symbol whose constellation is unknown, and either a soft or hard decision on each symbol whose constellation is known, depending on how close the soft estimate is to the hard decision. Such a mixed-decision PIC typically outperforms both the soft-decision PIC and the hard-decision PIC. Moreover, it can also substantially outperform the optimal LMMSE receiver and promises even greater performance gains over PNA-LMMSE approaches currently under development for advanced receivers. The performance of soft-decision PIC is bounded by the optimal LMMSE.

SUMMARY OF THE INVENTION

In view of the foregoing background, embodiments of the present invention may provide a generalized interference-canceling receiver for canceling intra-channel and inter-channel interference in coded, multiple-access, spread-spectrum transmissions that propagate through frequency-selective communication channels. Receiver embodiments may employ a designed and/or adapted soft-weighting subtractive cancellation with a stabilizing step-size and a mixed-decision symbol estimator. Receiver embodiments may be designed, adapted, and implemented explicitly in software or programmed hardware, or implicitly in standard Rake-based hardware, either within the Rake (i.e., at the finger level) or outside the Rake (i.e., at the sub channel symbol level). Embodiments of the invention may be employed in user equipment on the forward link and/or in a base station on the reverse link.

Some embodiments of the invention address the complexity of the LMMSE approach by using a low-complexity iterative algorithm. Some embodiments of the invention in soft-mode may be configured to achieve LMMSE performance (as contrasted to the lesser-performing PNA-LMMSE) using only quantities that are easily measured at the receiver. Some embodiments address the sub-optimality of the LMMSE and PNA-LMMSE approaches by using an appropriately designed mixed-decision mode and may even approach the performance of an optimal multi-user detector. In some embodiments, stabilizing step sizes may be used to enhance stability of various PIC approaches. Some embodiments may employ symbol-estimate weighting to control convergence of various PIC approaches. Some embodiments of the invention address the limitation of various PIC approaches to binary and quaternary phase shift keying in mixed-decision mode by being configurable to any sub channel constellation. Some embodiments of the invention address the difficulty of efficiently implementing various PIC approaches in hardware by using a modified Rake architecture. Some embodiments of the invention address the so-called "ping-pong effect" (i.e., when the symbol error rate oscillates with iteration) in various PIC approaches by pre-processing with a de-biasing operation when making symbol estimates.

In one embodiment of the invention, an iterative interference cancellation system is configured for performing a plurality of iterations for each input symbol estimate of a received signal to produce an interference-cancelled symbol estimate. The system comprises a weighting means, a synthesizing means, a subtraction means, a stabilizing step size means, a combining and resolving means, and a mixed-decision means.

The weighting means applies symbol weights to each of a plurality of input symbol estimates for an initial iteration, and to each of a plurality of updated symbol estimates for at least one subsequent iteration for producing a plurality of weighted symbol estimates.

The weighting means may include, by way of example, but without limitation, a weight-calculation means configured for producing symbol weights, and a multiplier configured for multiplying symbol estimates by the weights.

The weight-calculation means may include, by way of example, but without limitation, any combination of hardware and software configured to calculate symbol weights from a function employing a merit of at least one input symbol decision. In one embodiment, the merit may comprise an average ratio of signal power to interference-plus-noise power (or a function thereof). In another embodiment, the merit may be a function of input symbol decisions and proximity of those input symbol decisions to a nearby constellation point. In this case, the weight-calculation means may employ time-series averaging for calculating the proximity as a statistical average. In yet another embodiment, the weight-calculation means may include a signal processing means configured to perform statistical signal processing for estimating the average ratio of signal power to interference-plus-noise power. Such statistical signal processing may employ error-vector magnitude calculations.

The synthesizing means is configured for employing a signal basis for all symbol sources in the channel to synthesize constituent signals from the plurality of weighted symbol estimates. The synthesizing means may combine the constituent signals for producing a combined signal. The combined signal may be considered as approximating a received signal that would result from signals transmitted by at least one hypothetical transmitter configured to transmit signals synthesized from the plurality of weighted symbol estimates.

The synthesizing means may include, by way of example, but without limitation, a signal processor or a set of elements of a transmitter configured to process symbol estimates for producing at least one modulated digital baseband signal, such as a signal that may be produced by a transmitter prior to up-conversion, amplification, and coupling into a communication channel. In one embodiment, the synthesizing means comprises a Walsh coder (such as a fast Walsh transform) and a pseudo-noise (PN) coder.

The subtraction means is configured to subtract the combined signal from the received signal to produce an error signal. The subtraction means may include, by way of example, but without limitation, an adder, a combiner, or any other device or method configured for subtracting a first set of signals from a second set of signals.

The stabilizing step size means is configured for scaling the error signal by a stabilizing step size to produce a scaled error signal. The stabilizing step size means may include, by way of example, but without limitation, any combination of hardware and software configured to scale an error signal with a scaling factor that may be used for controlling convergence in an iterative canceller. For example, the stabilizing step-size means may comprise a step size calculation means and a multiplier means for scaling an error signal with the step size.

The step size calculation means is configured for calculating a stabilizing step size having a magnitude that is a function of proximity of the input symbol decisions to a desired interference-cancelled symbol decision. The multiplier means is configured for scaling (e.g., multiplying) an error signal with the stabilizing step size. The step size calculation means may include, by way of example, but without limitation, software or programmable hardware configured for calculating a stabilizing step size.

The combining and resolving means is configured for processing the scaled error signal with the constituent signals and/or the plurality of weighted symbol estimates to produce interference-cancelled symbol estimates. The combining and resolving means may comprise a combining means separate from a resolving means. The resolving means may precede or follow the combining means.

The resolving means is configured for resolving a scaled error signal or each of a plurality of interference-cancelled constituent signals onto a signal basis for all of symbol sources in a channel. The resolving means may include, by way of example, but without limitation, a channel estimator, a PN decoder, and a Walsh decoder.

The combining means may be configured for combining the resolved error signal with the weighted input symbol estimates, or it may be configured for adding the constituent signals to the scaled error signal. The combining means may include, by way of example, but without limitation, an adder or combiner configured to sum a plurality of input signals.

The mixed-decision means is configured to perform a mixed decision comprising a hard decision or a soft decision on each of the interference-cancelled symbol estimates to produce the plurality of updated symbol estimates. The mixed-decision processing means may include, by way of example, but without limitation, a combination of hardware and software configured to produce soft and/or hard symbol estimates. The mixed-decision means comprises a de-biasing means configured for scaling the input symbol estimates with a scale factor to remove bias computed on the input symbol estimates, and a processing means configured for processing each de-biased input symbol estimate, irrespective of other symbol estimates. The processing means produces a hard decision that quantizes the de-biased input symbol estimate onto a nearby constellation point, or a soft decision that scales the de-biased input symbol estimate.

Embodiments of the invention may be employed in any receiver configured to support one or more CDMA standards, such as (1) the "TIA/EIA-95-B Mobile Station-Base Station Compatibility Standard for Dual-Mode Wideband and Spread Spectrum Cellular System" (the IS-95 standard), (2) the "TIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) Multi-Code CDMA systems, such as High-Speed-Downlink-Packet-Access (HSDPA), and (6) other CDMA standards.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

These and other embodiments of the invention are described with respect to the figures and the following description of the preferred embodiments.

BRIEF DESCRIPTION OF THE DRAWINGS

Embodiments according to the present invention are understood with reference to the schematic block diagrams of FIGS. 1 through 12.

Figure 1:
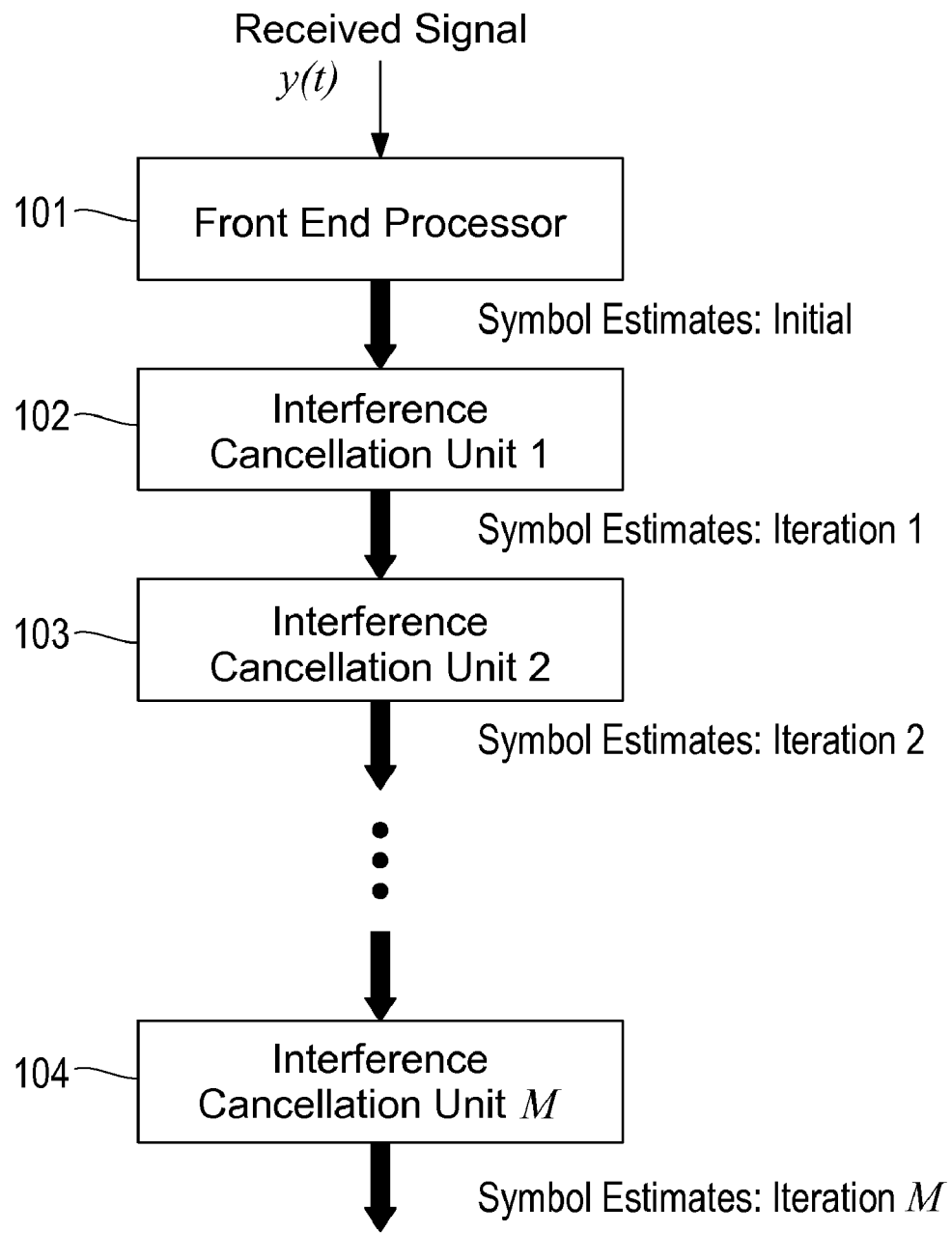
FIG. 1 is a general schematic illustrating an iterative interference canceller.

Various functional elements or steps, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

First the invention will be described as it applies to a forward-link channel, and then extended to include reverse-link channels. The following formula represents an analog baseband signal received at a mobile from multiple base stations, each with its own multipath channel, $$y(t) = \sum_{s=0}^{B-1} \sum_{l=0}^{L_{(s)}} \alpha_{(s),l} \sum_{k=0}^{K_{(s)}-1} b_{(s),k} u_{(s),k}(t - \tau_{(s),l}) + w(t), \quad \text{Equation 1}$$

$$t \in (0, T),$$

with the following definition (0, T) is the symbol internal;

B is the number of modeled base stations and is indexed by the subscript (s) which ranges from (0) to (B−1); here, and in the sequel, the term "base stations" will be employed loosely to include cells or sectors;

$L_{(s)}$ is the number of resolvable (or modeled) paths from base station (s) to the mobile;

$\alpha_{(s),l}$ and $\tau_{(s),l}$ are the complex gain and delay, respectively, associated with the l-th path of base station (s);

$K_{(s)}$ is the number of active users or subchannels in base station (s) that share a channel via code-division multiplexing; these users or subchannels are indexed from 0 to $K_{(s)}-1$;

$u_{(s),k}(t)$ is a code waveform (e.g., spreading waveform) of base station (s) used to carry the $k^{th}$ user's symbol for the base station (e.g., a chip waveform modulated by a user-specific Walsh code and covered with a base-station specific PN cover);

$b_{(s),k}$ is a complex symbol transmitted for the $k^{th}$ user or subchannel of base station (s);

and w(t) is zero-mean complex additive noise that contains both thermal noise and any interference whose structure is not explicitly modeled (e.g., inter-channel interference from unmodeled base stations and/or intra-channel interference from unmodeled paths).

Typically a user terminal (e.g., a handset) is configured to detect only symbols transmitted from its serving base station (e.g., the symbols from base station (0)) or a subset thereof (e.g., symbols for the $k^{th}$ user of base station (0)). Interference can impede the determination of $b_{(s),k}$ from y(t). Not only is additive noise w(t) present, but there may be intra-channel and inter-channel interference.

Intra-channel interference typically occurs when multiple users are served by a given base station (i.e., a serving base station). Even if the user's transmitted code waveforms are orthogonal, multipath in the transmission channel causes the codes to lose their orthogonality. Inter-channel interference is caused by transmissions from non-serving base stations whose signals contribute to the received baseband signal y(t).

FIG. 1 is a block diagram of an iterative interference canceller (IIC), which is a low-complexity receiver configured to mitigate intra-channel and inter-channel interference. The received baseband signal y(t) is input to a front-end processor 101, which produces initial symbol estimates for all symbols of the active users served by at least one base station. The initial symbol estimates are coupled to a first interference cancellation unit (ICU) 102 configured to cancel a portion of the intra-channel and inter-channel interference that corrupts the symbol estimates. The ICU 102 outputs a first set of updated symbol estimates, which are interference-cancelled symbol estimates. The updated symbol estimates are coupled to a second ICU 103. A plurality M of ICUs 102-104 illustrate an iterative process for performing interference cancellation in which the initial symbol estimates are updated M times.

Figure 2:
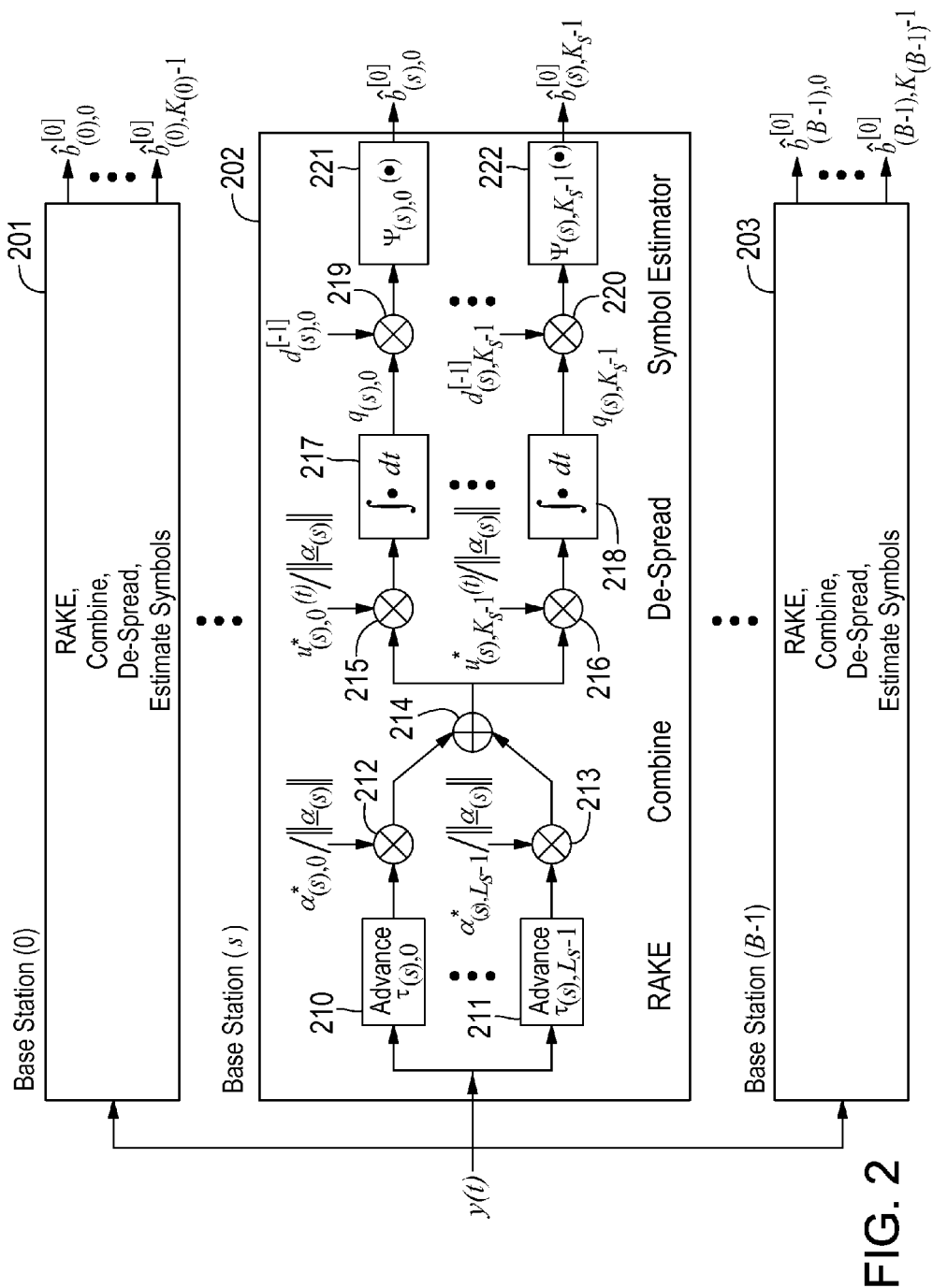
FIG. 2 is a block diagram illustrating a front-end processor for an iterative interference canceller.

FIG. 2 is a block diagram of the front-end processor 101 shown in FIG. 1. Each of a plurality B of Rake-based receiver components 201-203 provides estimates of symbols transmitted from a corresponding base station. The detailed block diagram depicted in Rake receiver 202 represents the functionality of each of the components 201-203. Rake receiver 202, corresponding to an $s^{th}$ base station 202, includes a plurality $L_{(s)}$ of delay elements 210-211 configured to advance the received baseband signal y(t) in accordance with multipath-delay quantities $\{\tau_{(s),l}\}_{l=0}^{L_{(s)}-1}$. The advanced signals are scaled 212-213 by corresponding path gains $\{\alpha_{(s),l}\}_{l=1}^{L_{(s)}-1}$ prior to combining 214 to produce a combined signal of the form $$\sum_{l=1}^{L_{(s)}-1} \frac{\alpha_{(s),l}^*}{\|\alpha_{(s)}\|} y(t+\tau_{(s),l}),$$

$$\text{where } \|\alpha_{(s)}\| = \left(\sum_{l=0}^{L_{(s)}-1} |\alpha_{(s),l}|^2\right)^{1/2}$$

is the Euclidean norm of the path-gain vector, $\alpha_{(s)} = [\alpha_{(s),0}\ \alpha_{(s),1}\ \ldots\ \alpha_{(s),L_{(s)}-1}]^T$, and the superscript T denotes the matrix transpose operator.

The combined signal is resolved onto the users' code waveforms by correlative despreading, which comprises multiplying 215-216 the combined signals by complex conjugates of each code waveform, followed by integrating 217-218 the resultant products. A despread signal corresponding to a $k^{th}$ code waveform is $$q_{(s),k} \equiv \frac{1}{\|\alpha_{(s)}\|^2} \int_0^T u_{(s),k}^*(t) \sum_{l=0}^{L_{(s)}-1} \alpha_{(s),l}^* y(t+\tau_{(s),l}) dt. \qquad \text{Equation 2}$$

This value is also referred to as a Rake front-end soft estimate of the symbol $b_{(s),k}$. Since Rake processing, combining, and despreading are linear operations, their order may be interchanged. Thus, alternative embodiments may be provided in which the order of the linear operations is changed to produce $q_{(s),k}$.

A symbol estimator comprises scaling blocks 219-220 and function blocks 221-222, which are configured to refine the estimates $q_{(s),k}$ into front-end symbol estimates $\hat{b}_{(s),k}^{[0]}$ of the transmitted data symbols $b_{(s),k}$. Each of the functions depicted in FIG. 2 may be configured to process discrete-time sequences. For example, time advances 210-211 (or delays) may be implemented as shifts by an integer number of samples in discrete-time sequences, and integration 217-218 may employ summation.

Figure 3:
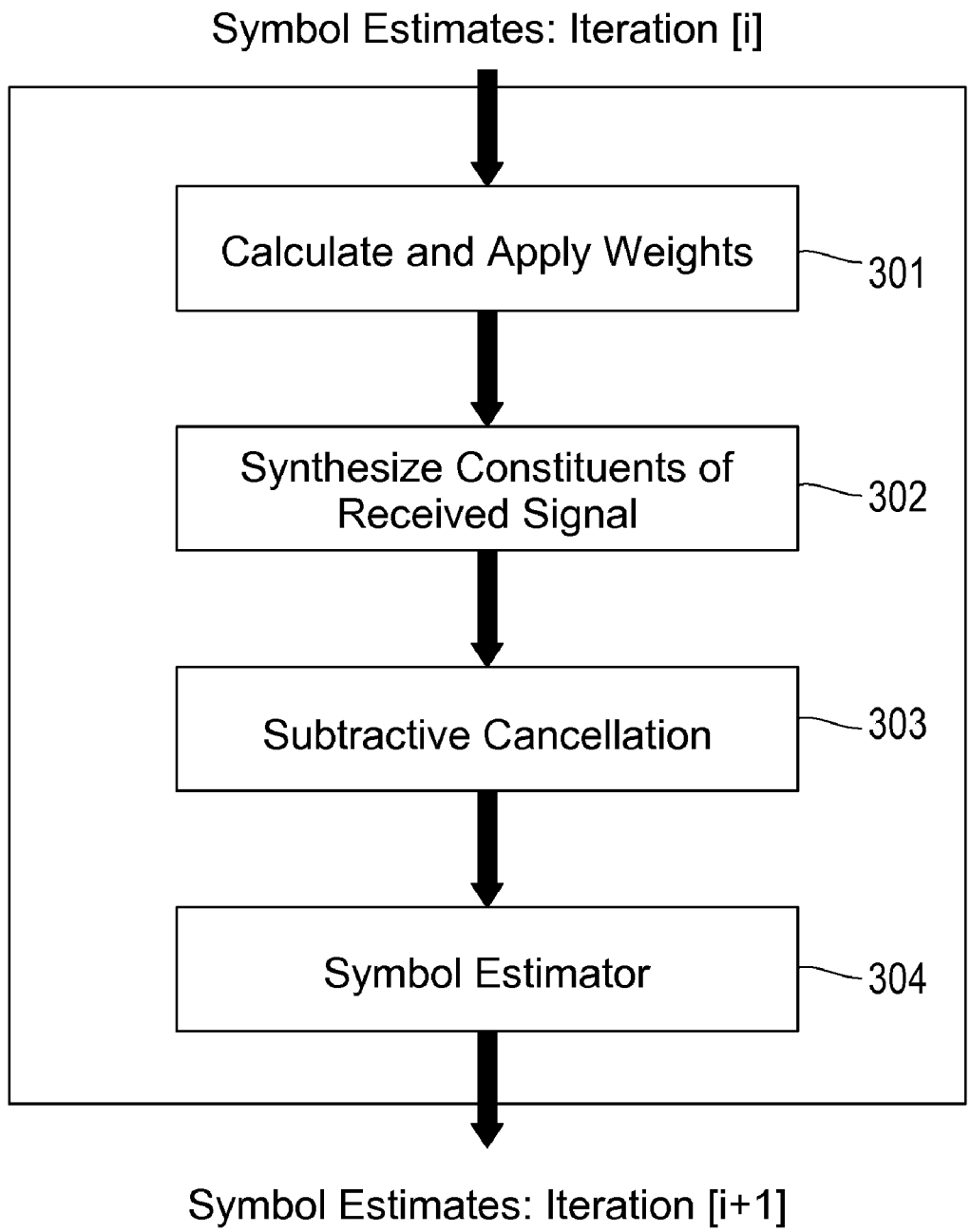
FIG. 3 is a general schematic illustrating an interference cancellation unit (ICU).

FIG. 3 is a block diagram of an $i^{th}$ ICU comprising four functional blocks. A weighting module 301 calculates and applies soft weights to input symbol estimates. A synthesizing module 302 processes weighted symbol estimates to synthesize constituent signals of an estimated received signal. For example, the estimated received signal y(t) is a sum of the constituent signals, each of which is synthesized from the weighted symbol estimates. The synthesized constituents are processed in a canceller 303 (such as a subtraction module) configured to produce interference-cancelled signals having reduced intra-channel and inter-channel interferences. The canceller 303 also includes a resolving module (not shown) configured to resolve the interference-cancelled signals onto user code waveforms to produce resolved signals. A mixed-decision module 304 processes the resolved signals to produce updated symbol estimates.

Figure 4:
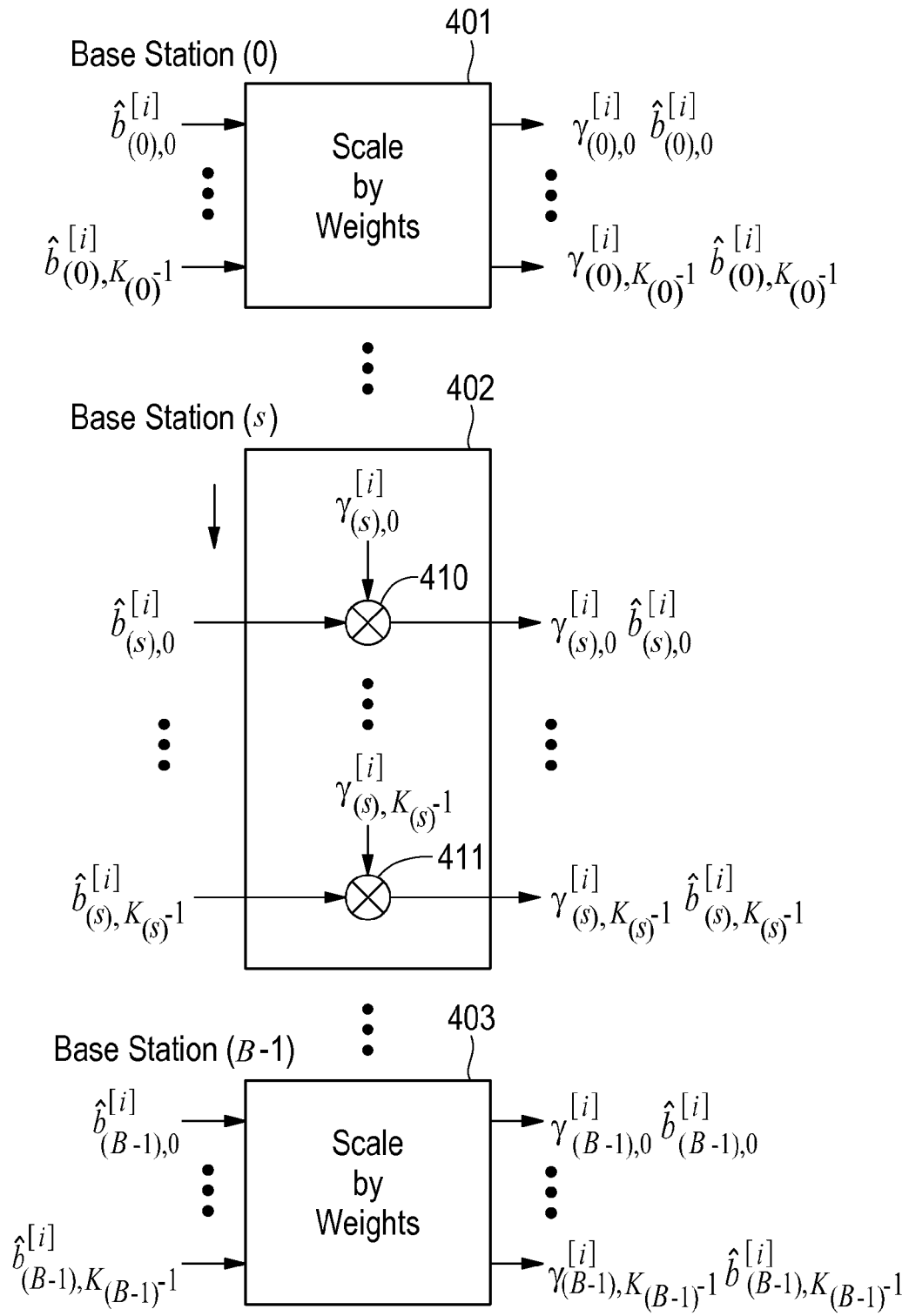
FIG. 4 shows a weighting block in an ICU configured to separately process input symbol estimates corresponding to a plurality of base stations.

FIG. 4 shows a weighting module (such as weighting n10dule 301) configured to separately process input symbol estimates corresponding to a plurality B of base stations. A plurality of scaling modules 401-403 scale the input symbol estimates. Scaling module 402 depicts detailed functionality for processing signals from an exemplary $s^{th}$ base station. Similar details are typically present in each of the scaling modules 401-403.

A plurality $K_{(s)}$ of symbol estimates $\{\hat{b}_{(s),k}^{[i]}\}_{k=0}^{K_{(s)}-1}$ of transmitted symbols $\{b_{(s),k}\}_{k=0}^{K_{(s)}-1}$ produced by an $i^{th}$ ICU is input to scaling module 402. The symbol estimates are multiplied 410-411 by corresponding complex weights $\{\gamma_{(s),k}^{[i]}\}_{k=0}^{K_{(s)}-1}$ to produce weighted symbol estimates $\{\gamma_{(s),k}^{[i]}\hat{b}_{(s),k}^{[i]}\}_{k=0}^{K_{(s)}-1}$. The magnitude of weight $\gamma_{(s),k}^{[i]}$ may be calculated with respect to a merit of the corresponding symbol estimate $\hat{b}_{(s),k}^{[i]}$.

The soft weights can be regarded as a confidence measure related to the accuracy of a decision, or symbol estimate. For example, a high confidence weight relates to a high certainty that a corresponding decision is accurate. A low confidence weight relates to a low certainty. Since the soft weights are used to scale decisions, low-valued weights reduce possible errors that may be introduced into a calculation that relies on symbol estimates.

In one embodiment of the invention, the weights $\gamma_{(s),k}^{[i]}$ may be derived from at least one signal measurement, such as SINR. Clearly, the larger the SINR, the greater the reliability of the corresponding symbol estimate. For example, the weights $\gamma_{(s),k}^{[i]}$ may be expressed by $$\gamma_{(s),k}^{[i]} = \max\left\{C_{(s),k}, \frac{1}{1+1/SINR_{(s),k}^{[i]}}\right\}, \qquad \text{Equation 3}$$

where $SINR_{(s),k}^{[i]}$ is a ratio of average signal power to interference-plus-noise power of a $k^{th}$ user in base station (s) after the $i^{th}$ ICU, and $C_k$ is a non-negative real constant that can be used to ensure some feedback of a symbol estimate, even if its SINR is small. Note that, as the SINR grows large, the weight tends toward unity, meaning that the estimate is very reliable.

The SINR (and thus, the soft weights) may be evaluated using techniques of statistical signal processing, including techniques based on an error-vector magnitude (EVM). Alternatively, a pilot-assisted estimate of the broadband interference-plus-noise floor, together with a user specific estimate of the signal-plus-interference-plus-noise floor, may be used to estimate the SINR values. In another embodiment of the invention, the weights $\gamma_{(s),k}^{[i]}$ may be expressed as a function of symbol estimates $\hat{b}_{(s),k}^{[i]}$ such as shown in the following equation $$\gamma_{(s),k}^{[i]} = \frac{\operatorname{Re}\left\{E\left[\operatorname{slice}(\hat{b}_{(s),k}^{[i]})^* \hat{b}_{(s),k}^{[i]}\right]\right\}}{E\left[|\hat{b}_{(s),k}^{[i]}|^2\right]},$$ Equation 4 where Re{ } returns the real part of the argument. The statistical expectations E[ ] in the numerator and denominator can be estimated, for example, via time-series averaging. The term slice($\hat{b}_{(s),k}^{[i]}$), represents the symbol estimate $\hat{b}_{(s),k}^{[i]}$ sliced (i.e., quantized) to the nearest constellation point from which the symbol $b_{(s),k}$ was drawn. This approach is applicable for symbols with known constellations. For example, it is typical for a receiver to know the symbol constellation for a user of interest, but it may not know which constellations are assigned to other users.

In this embodiment, the weights $\gamma_{(s),k}^{[i]}$ are a function of a symbol estimate's) $\hat{b}_{(s),k}^{[i]}$ proximity to a given constellation point. Thus, a symbol estimate $\hat{b}_{(s),k}^{[i]}$ that is close to a constellation point is provided with a large weight indicative of a high confidence measure in the symbol estimate's accuracy. For example, if the value $\hat{b}_{(s),k}^{[i]}$ is a hard-decision estimate of $b_{(s),k}$ (i.e., it is quantized to the nearest constellation point), then its associated weight is $\gamma_{(s),k}^{[i]}=1$ which indicates a high degree of confidence in the symbol estimate.

In some embodiments, both Equation 3 and Equation 4 may be used in a receiver to calculate soft weights. Some embodiments of the invention may provide for subset selection to force one or more of the weights to zero. Such embodiments may be expressed as adaptations to Equation 3 and/or Equation 4 expressed by $\gamma_{(s),k}^{[i]}=0$ for some subset of the users. Equation 5

Forcing the weights of some users to zero effectively restricts which user signals are employed for interference cancellation. Some embodiments may provide for canceling only a predetermined number P of strongest users (e.g., users having the largest weight values). The number P may be fixed for all iterations, or it may vary with respect to iteration. In some embodiments, the number P may range from zero (i.e., no interference cancellation) to $$K \equiv \sum_{s=0}^{B-1} K_{(s)}$$

(i.e., interference of all users cancelled). In some embodiments, the weights of user signals transmitted from at least one weakest base station are set to zero.

Figure 5A:
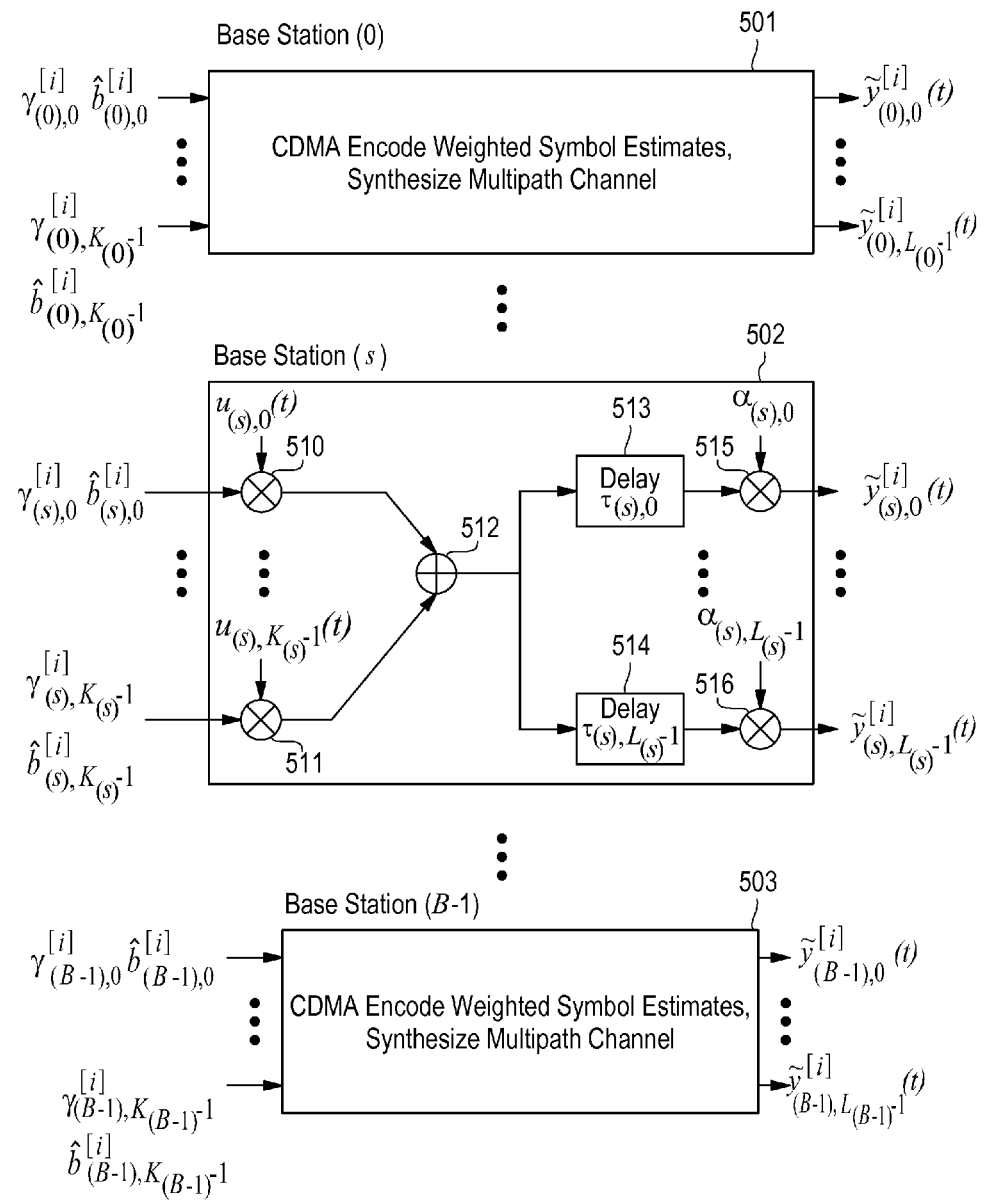
FIG. 5A is a block diagram illustrating part of an interference cancellation unit configured to synthesize constituent finger signals.

FIG. 5A is a block diagram of a synthesizing module (such as the synthesizing module 302) in which the constituent signals are associated with each Rake finger. Each of a plurality B of synthesizing modules 501-503 is assigned to one of a plurality B of base stations. A block diagram for an exemplary synthesizing module 502 corresponding to a base station (s) depicts details that are common to all of the synthesizing modules 501-503.

Weighted symbol estimates $\gamma_{(s),k}^{[i]}\hat{b}_{(s),k}$ are modulated 510-511 onto corresponding code waveforms $\mu_{(s),k}(t)$ to produce a plurality $K_{(s)}$ of coded waveforms, which are combined in combining module 512 to produce a synthesized transmission signal $$\sum_{k=0}^{K_{(s)}-1} \gamma_{(s),k}^{[i]} \hat{b}_{(s),k}^{[i]} u_{(s),k}(t).$$

Channel emulation (including delaying the synthesized transmission 515-516 with channel gains $\alpha_{(s),l}$) is performed to produce constituent signals corresponding to each finger. A synthesized constituent signal for an $l^{th}$ finger of base station (s) is $$\tilde{y}_{(s),l}^{[i]} \equiv \alpha_{(s),l} \sum_{k=0}^{K_{(s)}-1} \gamma_{(s),k}^{[i]} \hat{b}_{(s),k}^{[i]} u_{(s),k}(t-\tau_{(s),l})$$ Equation 6

When all of the finger constituents are summed, the result is $$\tilde{y}_{(t)}^{[i]} \equiv \sum_{s=0}^{B-1} \sum_{l=0}^{L_{(s)}-1} \tilde{y}_{(s),l}^{[i]}(t),$$ Equation 7 which is an estimate of the signal that would be received at the mobile if the base stations were to transmit the weighted symbols.

Figure 5B:
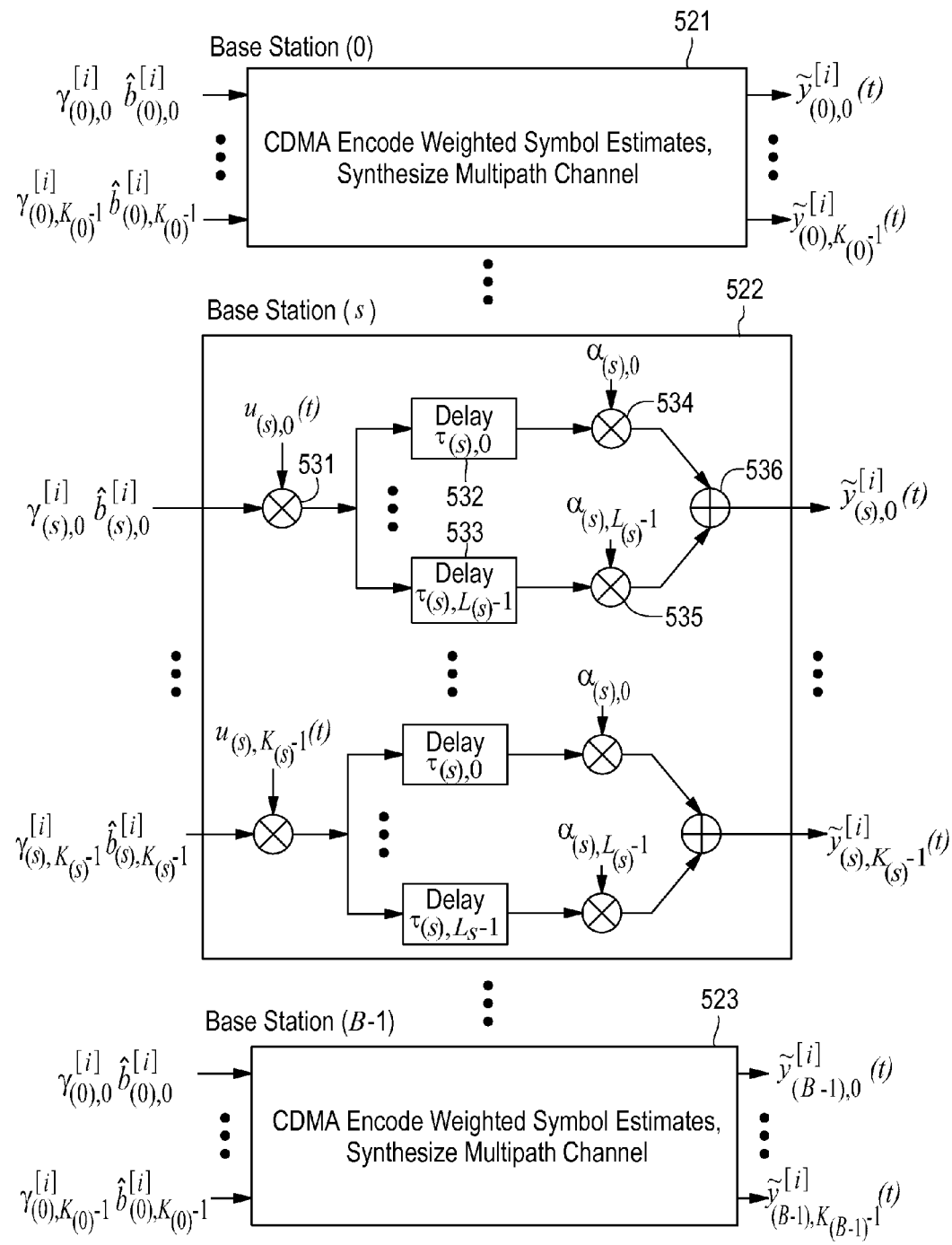
FIG. 5B is a block diagram illustrating part of an interference cancellation unit configured to synthesize constituent user signals.

FIG. 5B is a block diagram of a synthesizing module (such as the synthesizing module 302) in which the constituent signals are associated with each user in the system. Each synthesizing module 521-523 is configured to emulate multipath channels for all base stations. Synthesizing module 522 includes a block diagram that is indicative of the functionality of each of the synthesizing module 521-523

In synthesizing module 522, a plurality $K_{(s)}$ of modulators (such as modulator 531) modulates each weighted symbol $\gamma_{(s),k}^{[i]}\hat{b}_{(s),k}$ onto a corresponding code waveform $\mu_{(s),k}(t)$. Each modulated code waveform is processed by a bank of finger delay elements 532-533 and channel gain scaling elements 534-535 corresponding to the multipath channel of base station (s). The resulting emulated multipath components are combined in combining module 536 to produce an estimated received signal for a $k^{th}$ user of base station (s), $$\tilde{y}_{(s),k}^{[i]} \equiv \sum_{l=0}^{L_{(s)}-1} \alpha_{(s),l} \gamma_{(s),k}^{[i]} \hat{b}_{(s),k}^{[i]} u_{(s),k}(t-\tau_{(s),l}).$$ Equation 8

The subscript k on the left-hand side denotes that the constituent signal is for a user k, whereas the subscript l on the left-hand side of Equation 6 represents that the constituent signal is for a finger l. The sum of the user constituent signals produces a synthesized received signal $$\tilde{y}^{[i]}(t) \equiv \sum_{s=0}^{B-1} \sum_{k=0}^{K_{(s)}-1} \tilde{y}_{(s),k}^{[i]}(t).$$ Equation 9

The left-hand sides of Equation 7 and Equation 9 are the same signal, whereas the right-hand sides are simply two different decompositions.

Figure 6A:
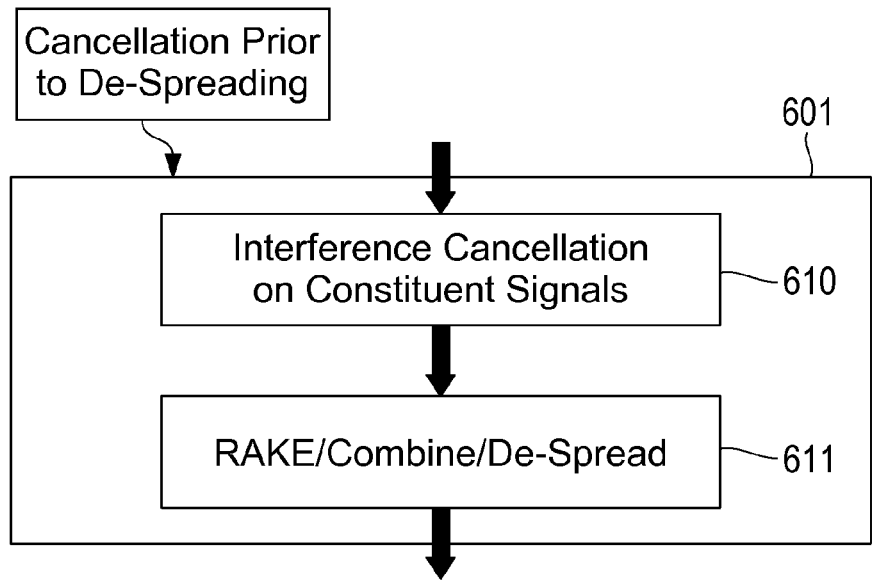
FIG. 6A shows a cancellation block configured to perform interference cancellation on constituent signals, followed by Rake processing and despreading.
Figure 6B:
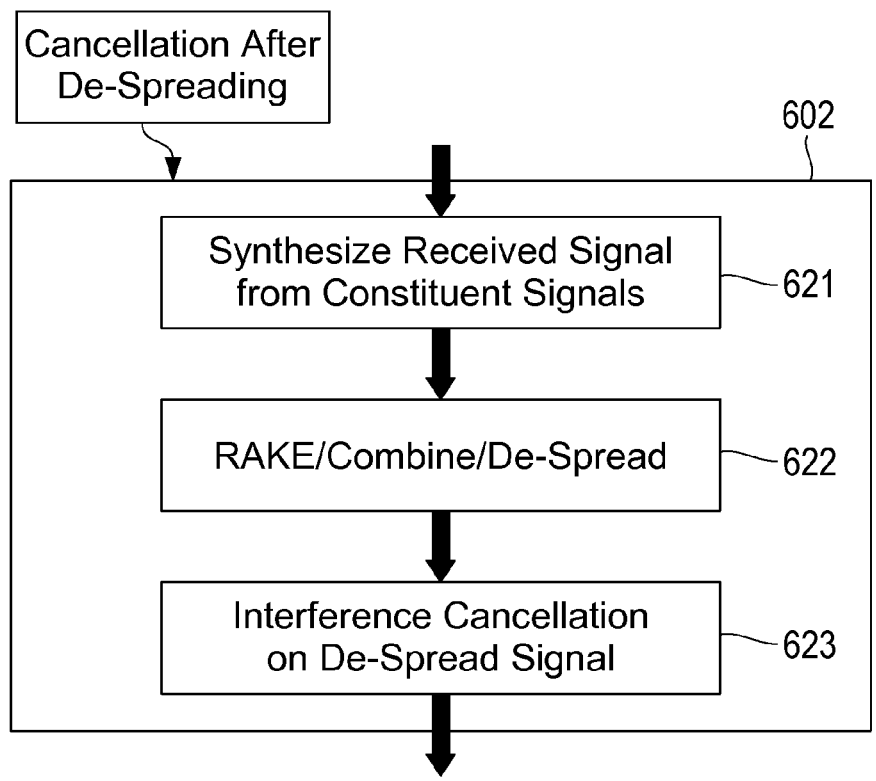
FIG. 6B shows a cancellation block configured to cancel interference in constituent signals, preceded by Rake processing and despreading.

FIG. 6A shows a cancellation module 601 (such as the canceller 303 in FIG. 3) configured to perform interference cancellation 610 on constituent signals, followed by Rake processing and despreading 611 in a Rake-based receiver. FIG. 6B shows a cancellation module 602 configured to synthesize 621 a received signal from constituent components, followed by Rake processing and despreading 622, and interference cancellation 623.

Figure 7:
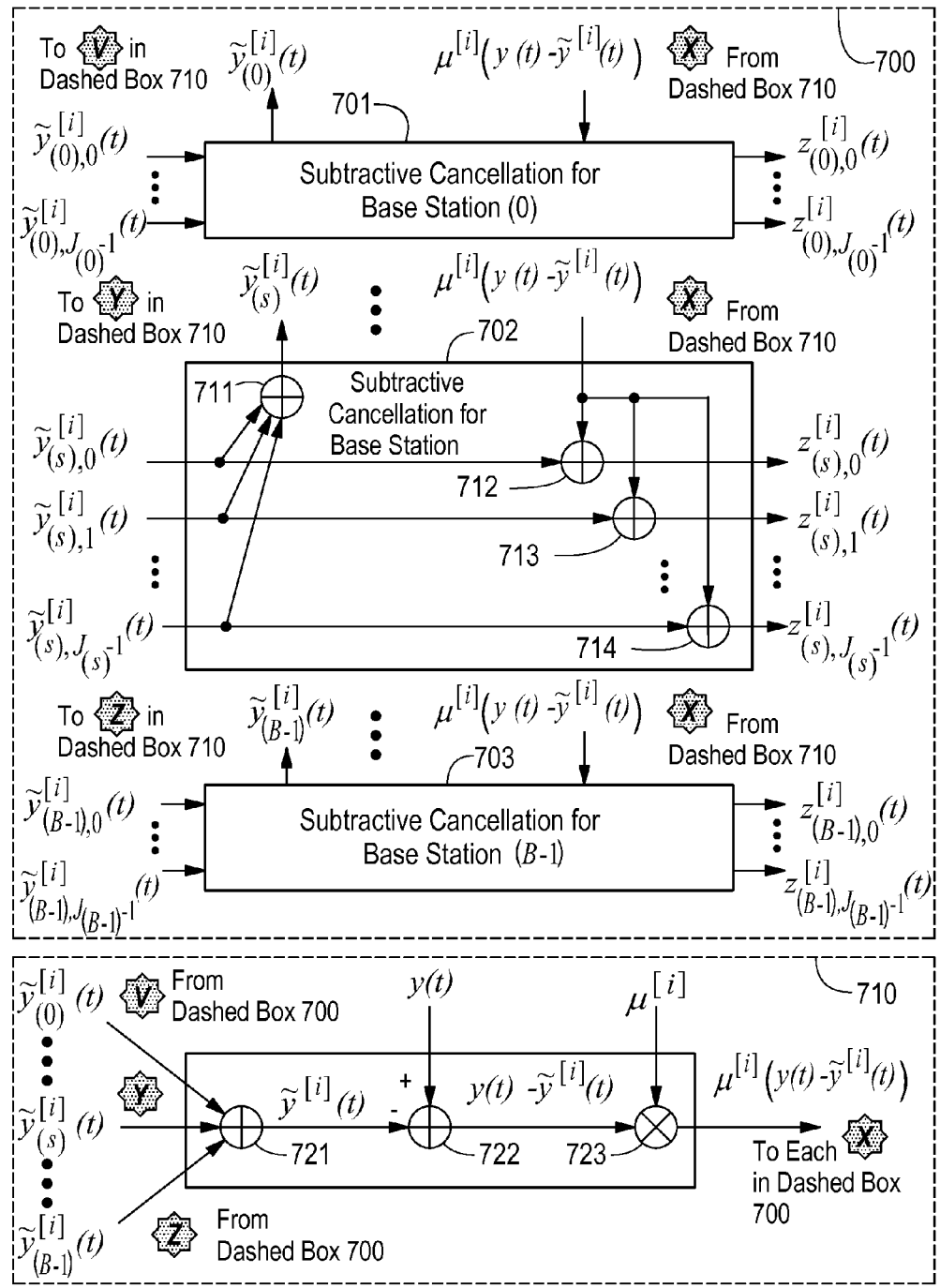
FIG. 7 is a block diagram of the interference cancellation part of a subtractive canceller in which cancellation occurs prior to signal despreading.

FIG. 7 is a block diagram of an interference canceller comprising a plurality B of cancellers 701-703 configured to perform interference cancellation on a plurality J of constituent signals for each of a plurality B of base stations. Since the constituents signals may be either fingers or users, index $j \in \{0, 1, \ldots, J_{(s)}-1\}$ is expressed by $$J_{(s)} = \begin{cases} L_{(s)} & \text{for finger constituents} \\ K_{(s)} & \text{for user condtituents} \end{cases}$$

Canceller 702 includes a block diagram that represents the functionality of each of the cancellers 701-703. The constituent signals corresponding to each base station are summed in a combining module 711 to produce a synthesized received signal, $$\tilde{y}_{(s)}^{[i]} \equiv \sum_{j=0}^{J_{(s)}-1} \tilde{y}_{(s),j}^{[i]},$$

where $\tilde{y}_{(s),j}^{[i]}$ is a $j^{th}$ constituent signal (either finger or user) for base station (s) A plurality of B of these sums corresponding to different base stations are combined in combining module 721 to produce a synthesized receive signal $$\tilde{y}_{(t)}^{[i]} = \sum_{s=0}^{B-1} \tilde{y}_{(s)}^{[i]}(t).$$

The synthesized receive signal is subtracted from the actual received signal in a subtraction module 722 to produce a residual signal $y(t)-\tilde{y}^{[i]}(t)$. A stabilizing step size module 723 scales the residual signal by a complex stabilizing step size $\mu^{[i]}$ to produce a scaled residual signal, $\mu^{[i]}(y(t)-\tilde{y}^{[i]}(t))$. The scaled residual signal is combined with the constituent signals $\tilde{y}_{(s),j}^{[i]}$ in combining modules 712-714 to produce a set of interference-cancelled constituents represented by $$z_{(s),j}^{[i]}(t) \equiv \tilde{y}_{(s),j}^{[i]}(t) + \mu^{[i]}(y(t)-\tilde{y}^{[i]}(t)), \quad \text{Equation 10}$$

where $z_{(s),j}^{[i]}(t)$ is an interference-cancelled $j^{th}$ constituent signal for base stations (s).

In an alternative embodiment, cancellation may be performed with only a subset of the constituent channels. In each base station, only those constituent signals being used for cancellation may be used to synthesize the estimated receive signal for base station (s). Thus, $\tilde{y}_{(s)}^{[i]}$ becomes $$\tilde{y}_{(s)}^{[i]} \equiv \sum_{j \in \tilde{J}_{(s)}} \tilde{y}_{(s),j}^{[i]}$$

where $\tilde{J}_{(s)} \subset \{0, 1, \ldots, J_{(s)}-1\}$ are indices of the subset of constituent signals to be employed in cancellation. Embodiments of the invention may be configured for applications in which hardware limitations restrict the number of finger signals or user signals that can be used for interference cancellation (e.g., only the strongest constituents are used).

Figure 8A:
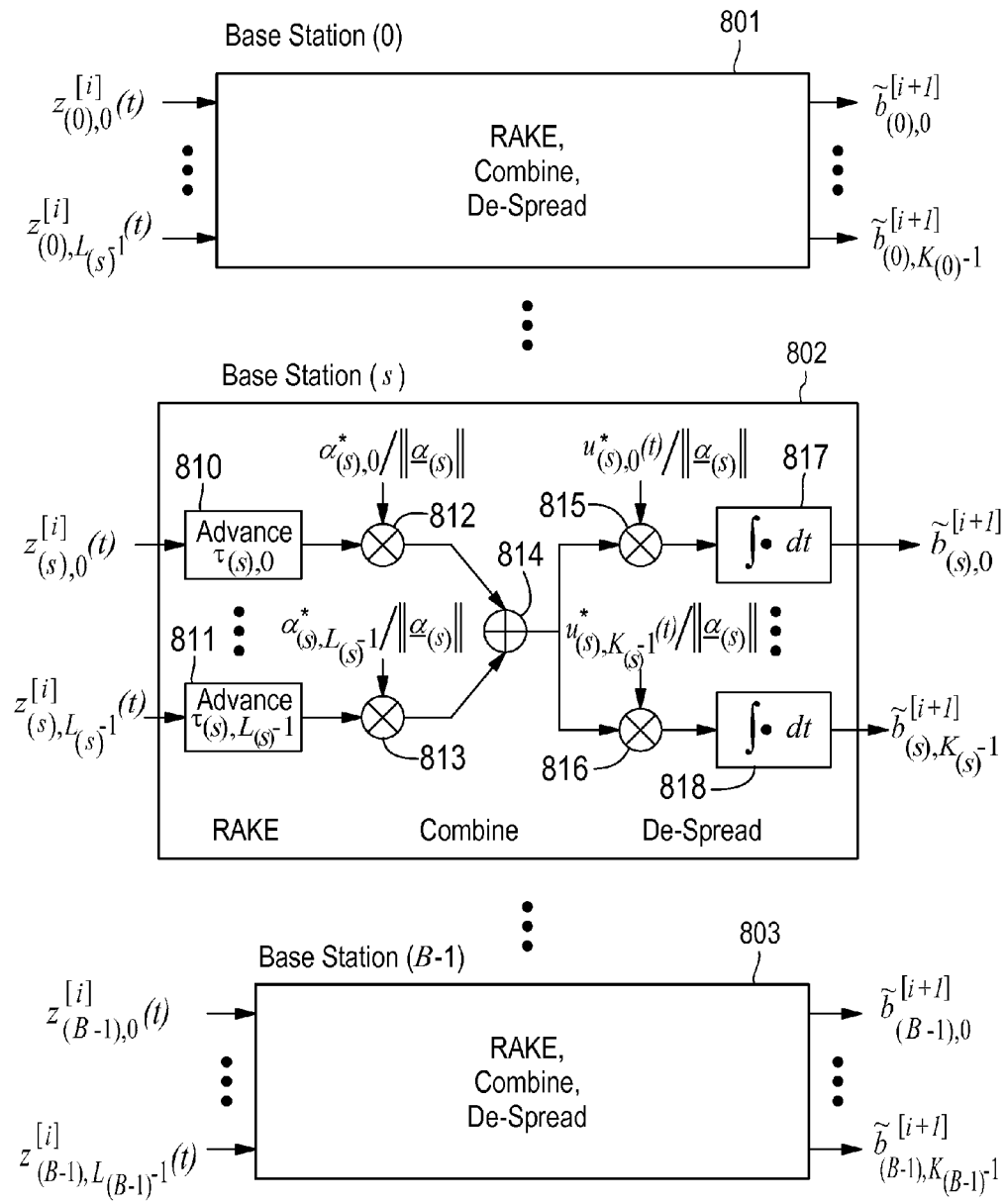
FIG. 8A is a block diagram illustrating post interference-cancellation signal despreading on constituent finger signals.

The interference-cancelled signals produced by the canceller shown in FIG. 7 may be processed by a Rake despreader shown in FIG. 8A, which is configured for processing finger inputs. Specifically, finger signals associated with each base station are input to corresponding fingers of a Rake despreading module tuned to that base station. A Rake despreading module 802 tuned to an $s^{th}$ base station comprises a block diagram indicating the functionality of a plurality B of Rake despreading modules 801-803.

Interference cancelled signals $z_{(s),l}^{[i]}(t)$ are time-advanced 810-811 by an amount $\tau_{(s),l}$. A maximal ratio combining module scales 812-813 each time-advanced a signal $z_{(s),l}^{[i]}(t+\tau_{(s),l})$ by $\alpha^*_{(s),l}/\|\alpha_{(s)}\|$ and combines 814 the time-advanced signals for each base station. A resolving module comprising multipliers 815-816 and integrators 817-818 resolves each combined signal $$\frac{1}{\|\alpha_{(s)}\|} \sum_{l=0}^{L_{(s)}-1} \alpha^*_{(s),l} z_{(s),l}^{[i]}(t+\tau_{(s),l})$$

onto code waveforms associated with base station (S) via correlative despreading. The resulting quantity for a $k^{th}$ user of base station (s) is denoted by $$\tilde{b}_{(s),k}^{[i]} = \frac{1}{\|\alpha_{(s)}\|^2} \int_0^T u^*_{(s),k}(t) \sum_{l=0}^{L_{(s)}-1} \alpha^*_{(s),l} z_{(s),l}^{[i]}(t+\tau_{(s),l}). \quad \text{(Equation 11)}$$

Figure 8B:
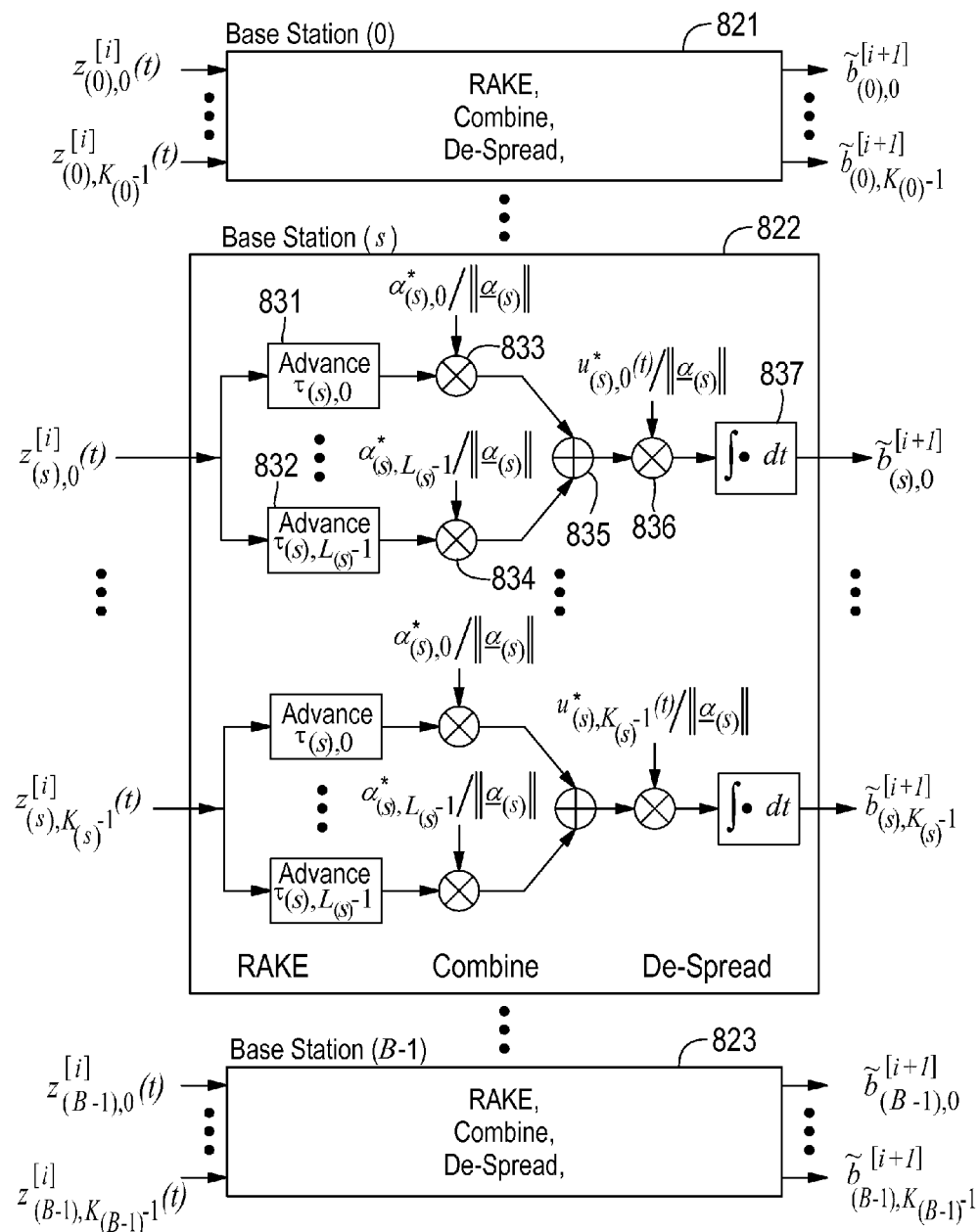
FIG. 8B is a block diagram illustrating post interference-cancellation signal de spreading on constituent user signals.

FIG. 8B is a block diagram of a Rake despreader configured for processing interference-cancelled signals relating to user inputs. In this case, the input constituent signals are user signals. A Rake despreading module 822 tuned to an $s^{th}$ base station comprises a block diagram indicating functional details that are common to a plurality B of Rake despreading modules 821-823.

Interference cancelled signals $Z_{(s),k}^{[i]}(t)$ corresponding to a $k^{th}$ user and $s^{th}$ base station are processed by a plurality $L_{(s)}$ of time-advance modules 831-832 corresponding to the multipath channel for the $s^{th}$ base station. The resulting time-advanced signals $\{z_{(s),k}^{[i]}(t+\tau_{(s),l})\}_{l=0}^{L_{(s)}-1}$ are weighted by a plurality of weighting modules 833-834, and the weighted signals are combined in combiner 835. A resolving module comprising multiplier 836 and integrator 837 resolves the combined signal onto the $k^{th}$ user's code waveform to give $$\tilde{b}_{(s),k}^{[i]} = \frac{1}{\|\alpha_{(s)}\|^2} \int_0^T u^*_{(s),k}(t) \sum_{l=0}^{L_{(s)}-1} \alpha^*_{(s),l} z_{(s),l}^{[i]}(t+\tau_{(s),l}). \quad \text{(Equation 12)}$$

The values $\tilde{b}_{(s),k}^{[i]}$ shown in Equation 11 and Equation 12 are generally not the same value, since the value of $\tilde{b}_{(s),k}^{[i]}$ in Equation 11 is produced by cancellation employing finger constituents, whereas $\tilde{b}_{(s),k}^{[i]}$ expressed by Equation 12 is produced by cancellation employing user constituents.

Figure 9A:
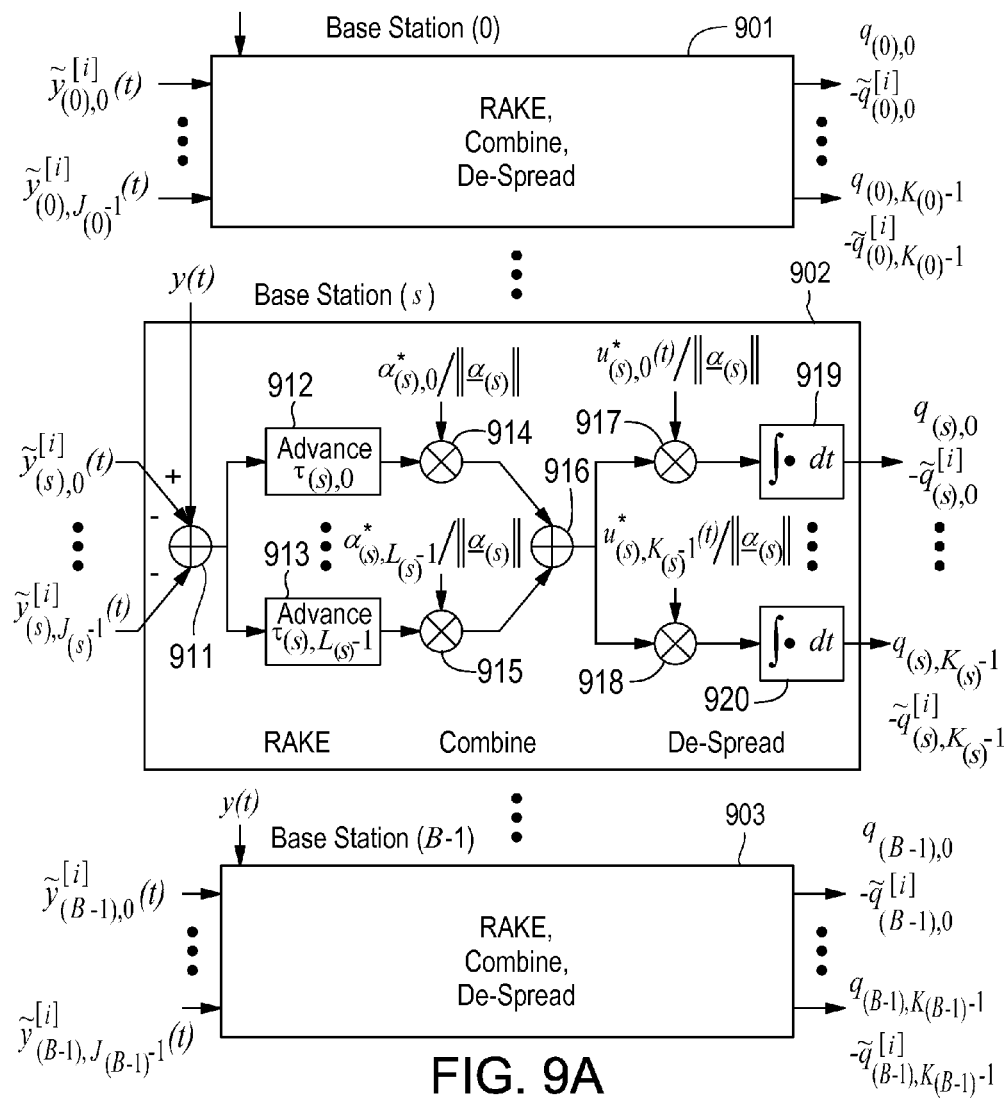
FIG. 9A is a block diagram showing a method for implicitly despreading a signal in a subtractive canceller that performs interference-cancellation prior to signal despreading.

FIG. 9A is a block diagram of a Rake despreader, such as Rake despreaders 611 and 622 shown in FIGS. 6A and 6B, respectively. The Rake despreader comprises a plurality B of Rake despreading modules 901-903, each configured to process constituent signals from one of a plurality B of base stations. An exemplary Rake despreader module 902 is a block diagram illustrating functionality of each of the Rake despreader modules 901-903.

Input constituent signals $\tilde{y}_{(s),j}^{[i]}(t)$ for all values of j are subtracted 911 from the received signal y(t) to produce a difference signal, or error signal, representing the difference between the received signal and the synthesized estimates of signals received by the base stations. For base station (s), the difference signal is $y(t) - \tilde{y}_{(s)}^{[i]}(t)$, where $$\tilde{y}_{(s)}^{[i]}(t) \equiv \sum_{j=0}^{J_{(s)}-1} \tilde{y}_{(s),j}^{[i]}(t).$$

The difference signal for base station (s) is processed by a parallel bank of time advance modules 912-913 associated with the multipath channel for that base station, followed by maximal-ratio combining. In this embodiment, a maximal-ratio combining module is configured to perform weighting 914-915 and combining 916. A resolving module comprising multipliers 917-918 and integrators 919-920 resolves the resulting combined signals onto code waveforms of the base station's users to give the difference signal vector, or error signal vector, $q_{(s),k} - \tilde{q}_{(s),k}^{[i]}$, where $$\tilde{q}_{(s),k}^{[i]} = \frac{1}{\|\alpha_{(s)}\|^2} \int_0^T u_{(s),k}^*(t) \sum_{l=0}^{L_{(s)}-1} \alpha_{(s),l}^* z_{(s),l}^{[i]}(t + \tau_{(s),l})$$

Equation 13 and $z_{(s)}^{[i]}(t)$ was defined in Equation 10.

Figure 9B:
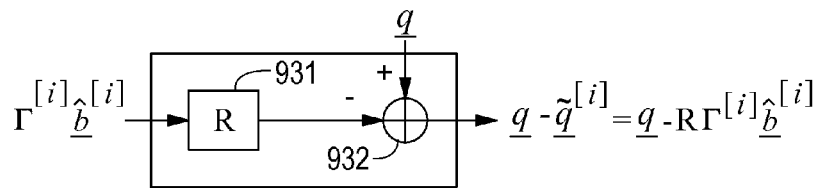
FIG. 9B is a block diagram showing a method for explicitly despreading a signal in a subtractive canceller that performs interference-cancellation prior to signal despreading.

Rake despreading, such as described with respect to the exemplary Rake despreading module 902, may also be accomplished explicitly by employing matrix multiplication to synthesize constituent signals of the received signal, such as represented by block 931 shown in FIG. 9B.

A diagonal soft-weighting matrix may be defined as $$\Gamma^{[i]} = \text{diag}(\gamma_{(0),0}^{[i]}, \ldots, \gamma_{(0),K^{(0)}-1}^{[i]} | \ldots | \gamma_{(B-1),0}^{[i]}, \ldots,$$
$$\gamma_{(B-1),K^{(B-1)}-1}^{[i]})$$

Equation 14 in which all of the users' soft weights are ordered first by base station and then by users within a base station. The same indexing may also be used to express the column vector of symbol estimates input to an $i^{th}$ ICU as $$\hat{b}^{[i]} = [\hat{b}_{(0),0}^{[i]}, \ldots, \hat{b}_{(0),K^{(0)}-1}^{[i]} | \ldots | \hat{b}_{(B-1),0}^{[i]}, \ldots,$$
$$\hat{b}_{(B-1),K^{(B-1)}-1}^{[i]}]^T.$$

Equation 15

The weighted symbol estimates are expressed as $\Gamma^{[i]} b^{[i]}$, and the outputs of the Rake despreading modules 901-903 are expressed by the difference equation, $$\underline{q} - \underline{\tilde{q}}^{[i]} = \underline{q} - R\Gamma^{[i]} \underline{b}^{[i]},$$

Equation 16 where, $$\underline{q} = [q_{(0),0}, \ldots, q_{(0),K^{(0)}-1} | \ldots | q_{(B-1),0}, \ldots, q_{(B-1),K^{(B-1)}-1}]^T$$

Equation 17

$$\underline{\tilde{q}}^{[i]} = [\tilde{q}_{(0),0}^{[i]}, \ldots, \tilde{q}_{(0),K^{(0)}-1}^{[i]} | \ldots | \tilde{q}_{(B-1),0}^{[i]}, \ldots, \tilde{q}_{(B-1),K^{(B-1)}-1}^{[i]}]^T.$$

Equation 18

The values of $q^{[i]}$ represent the despread signals, such as described with respect to FIG. 2. The values of $\tilde{q}^{[i]}$ are represented by Equation 13, and R is a square matrix whose elements are correlations between the users' received code waveforms. In FIG. 9B, the functionality expressed by Equation 16 is implemented via the matrix-multiplication block 931 and a subtraction module 932.

A global index $\kappa \in \{0, 1, \ldots, K-1\}$ with $$K \equiv \sum_{s=0}^{B-1} K_{(s)}$$

is employed for ordering users (first by base station, and then by users within a base station) described with respect to Equation 14. Thus, $\kappa = 0$ corresponds to a first user (denoted by index zero) of a first base station (denoted by an index zero), and $\kappa = K$ corresponds to a last user (denoted by index $K_{(B-1)}-1$) of a last base station (denoted by index (B-1)). If a user $\kappa$ is a member of base station (s) and a user $\kappa'$ is a member of base station (s'), then the ($\kappa, \kappa'$) element of matrix R may be expressed by $$R_{\kappa \kappa'} = \frac{1}{\|\alpha_{(s)}\| \|\alpha_{(s')}\|}$$

Equation 19

$$\int \sum_{l=0}^{L_{(s)}-1} \alpha_{(s),l} u_\kappa(t - \tau_{(s),l}) \sum_{l'=0}^{L_{(s')}-1} \alpha_{(s'),l'}^* u_{\kappa'}^*(t - \tau_{(s'),l'}) dt.$$

Thus, the elements of R can be built at the receiver with estimates of the path gains, path delays, and knowledge of the users' code waveforms.

Figure 10:
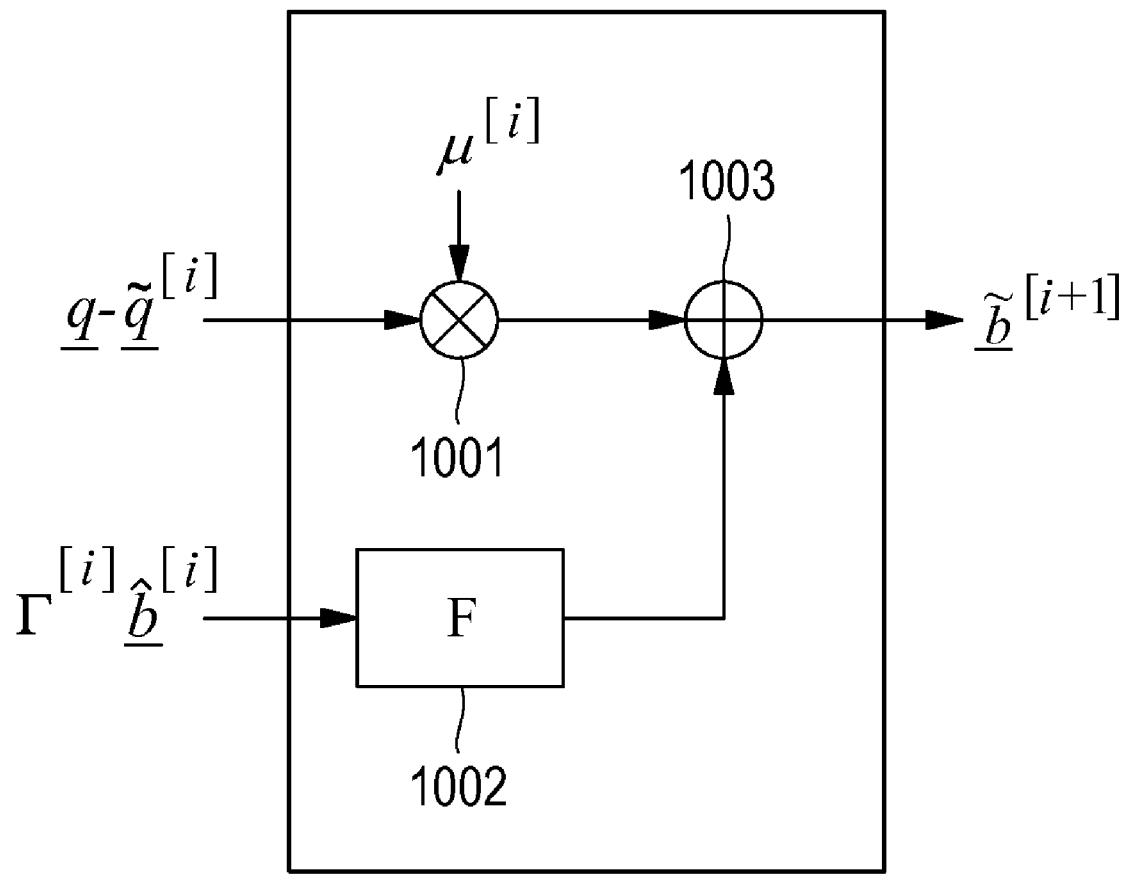
FIG. 10 is a block diagram of a subtractive canceller configured to perform interference cancellation prior to signal despreading.

FIG. 10 is a block diagram of an interference canceller, such as the interference-cancellation block 623 shown in FIG. 6. The difference signal $q_{(s),k} - \tilde{q}_{(s),k}^{[i]}$ is scaled with a stabilizing step size $\mu^{(i)}$ by a stabilizing step size module 1001, which may include a calculation module (not shown) configured to calculate a stabilizing step size having a magnitude that is a function of proximity of input symbol decisions to a desired interference-cancelled symbol decision. The resulting scaled difference signal is summed 1003 with a product 1002 of the weighted symbol estimates $\Gamma^{[i]} \hat{b}^{[i]}$ and a K×K implementation matrix F to yield $$\underline{\hat{b}}^{[i+1]} = F\Gamma^{[i]} \underline{\hat{b}}^{[i]} + \mu^{[i]} (\underline{q} - \underline{\tilde{q}}^{[i]}).$$

Equation 20

The choice of F allows interference cancellation after despreading to mimic interference cancellation prior to despreading for either user constituents or finger constituents. For user constituents, F=I. For finger constituents, F is a block-diagonal matrix with a plurality B of diagonal blocks, wherein an $s^{th}$ diagonal block is a $K_{(s)} \times K_{(s)}$ block representing the users' transmit correlation matrix for base station (s). The (k, k') element of the $s^{th}$ diagonal block (denoted by $F_{(s)(s)}$) is equal to $$(F_{(s)(s)})_{kk'} = \int u_{(s),k}(t) u_{(s),k'}^*(t) dt.$$

Equation 21

The stabilizing step size $\mu^{[i]}$ may be used to enhance interference cancellation in each ICU and/or stabilize iterative interference cancellation. A quality metric of a canceller's output $\hat{b}^{[i+1]}$ may be derived as follows. If it is known (or approximated) that the additive noise w(t) in Equation 1 is Gaussian, then the despread outputs q, conditional on the transmitted symbols $$\underline{b} = [b_{(0),0}, \ldots, b_{(0),K^{(0)}-1} | \ldots | b_{(B-1),0}, \ldots,$$
$$b_{(B-1),K^{(B-1)}-1}]^T,$$

Equation 22 are jointly complex normal random variables with mean Rb and covariance $\Gamma^{[i]} R$ (i.e., q|b is distributed as CN(Rb;R)). If it is approximated that $\underline{q} | \underline{\hat{b}}^{[i+1]}$ is distributed as CN(R$\hat{b}^{[i+1]}$;R, where $\tilde{b}^{[i+1]}$ and its dependence on $\mu^{[i]}$ are given by Equation 20, then the value of $\mu^{[i]}$ that fives the maximum-likelihood soft estimate for $\tilde{b}^{[i+1]}$ is $$\mu^{[i]} = \frac{\left(q - RF\Gamma^{[i]}\hat{\underline{b}}^{[i]}\right)^H \left(q - R\Gamma^{[i]}\hat{\underline{b}}^{[i]}\right)}{\left(q - R\Gamma^{[i]}\hat{\underline{b}}^{[i]}\right)^H R\left(q - R\Gamma^{[i]}\hat{\underline{b}}^{[i]}\right)}.$$

Equation 23

Alternatively, the value of $\mu^{[i]}$ that gives the maximum-likelihood soft estimate for $\Gamma^{[i]}\tilde{\underline{b}}^{[i+1]}$ is $$\mu^{[i]} = \frac{\left(q - R\Gamma^{[i]}F\Gamma^{[i]}\hat{\underline{b}}^{[i]}\right)^H \Gamma^{[i]}\left(q - R\Gamma^{[i]}\hat{\underline{b}}^{[i]}\right)}{\left(q - R\Gamma^{[i]}\hat{\underline{b}}^{[i]}\right)^H (\Gamma^{[i]})^H R\Gamma^{[i]}\left(q - R\Gamma^{[i]}\hat{\underline{b}}^{[i]}\right)}.$$

Equation 24

Different formulations of the step-size may be used within the same IIC. For example, a step size based on Equation 23 may be used in a sequence of ICUs and Equation 24 may be used in the last ICU of the sequence. The Equations 23 and 24 may be adapted for cases in which there is no soft weighting (i.e., when $\Gamma^{[i]}=I$). Similarly step-size equations may be adapted when constituent user signals are employed (i.e., F=I). Furthermore, Equation 23 and Equation 24 may be determined implicitly whenever F=I, or when F is approximated as I. Since F contains the users' correlation matrices at the transmitter for each base station as its block diagonal, it will approximately equal identity, as the users' code waveforms are typically designed to be mutually orthogonal (or quasi-orthogonal for the reverse link). Any non-orthogonality is due to the finite duration of the pulse-shaping filters that approximate their infinite duration theoretical counterparts. In this case, Equation 23 becomes $$\mu^{[i]} = \frac{\left(q - R\Gamma^{[i]}\hat{\underline{b}}^{[i]}\right)^H \left(q - R\Gamma^{[i]}\hat{\underline{b}}^{[i]}\right)}{\left(q - R\Gamma^{[i]}\hat{\underline{b}}^{[i]}\right)^H R\left(q - R\Gamma^{[i]}\hat{\underline{b}}^{[i]}\right)}.$$

Equation 25

Figure 11A:
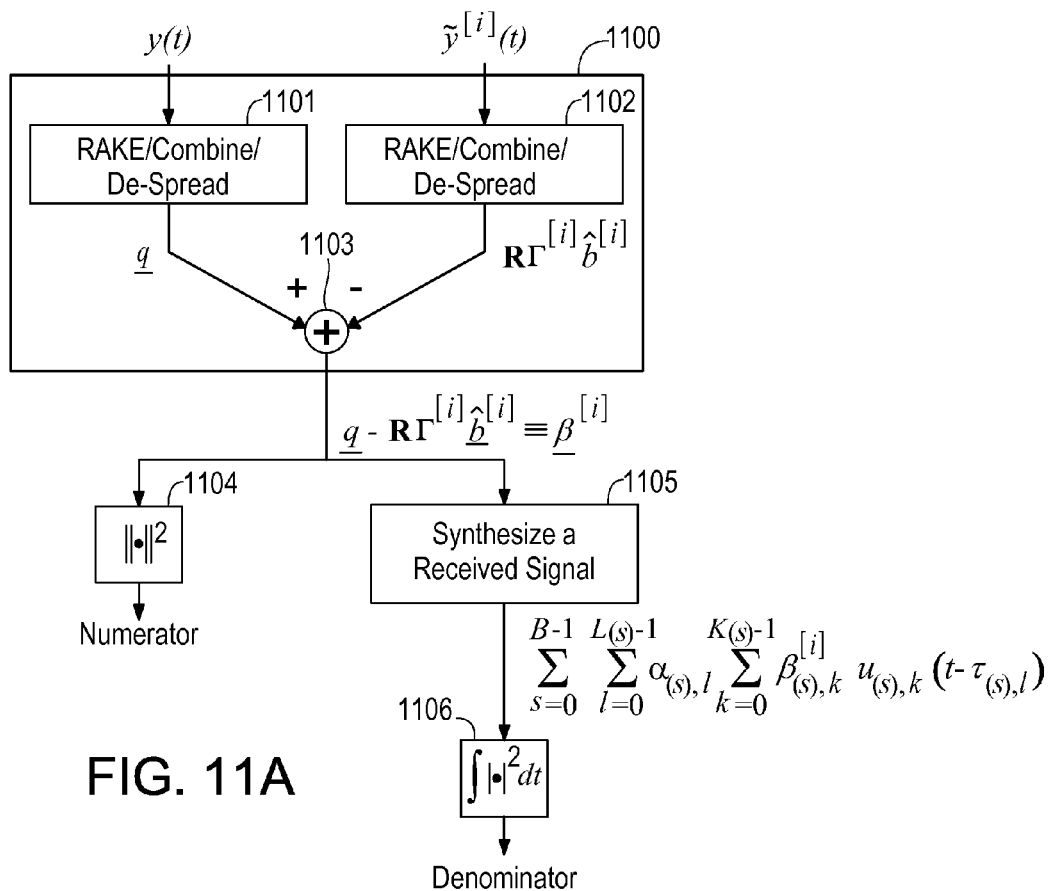
FIG. 11A is a block diagram illustrating an embodiment for implicitly calculating a stabilizing step size.

FIG. 11A illustrates a method and apparatus for calculating a stabilizing step size. A Rake receiver 1100 comprises a first Rake, maximal ratio combining, and despreading unit 1101 to process a received signal y(t) for producing an output despread signal vector q. A second Rake, maximal ratio combiner, and despreader unit 1102 processes a synthesized receive signal with weighted symbol estimates corresponding to an $i^{th}$ iteration, and represented by $$\tilde{y}^{[i]}(t) = \sum_{s=0}^{B-1} \sum_{l=0}^{L_{(s)}-1} \alpha_{(s),l} \sum_{k=0}^{K_{(s)}-1} \gamma_{(s),k}^{[i]} \hat{b}_{(s),k}^{[i]} u_{(s),k}(t - \tau_{(s),l}),$$

to produce an estimated received signal $R\Gamma^{[i]}\hat{b}^{[i]}$.

A combiner 1103 calculates the difference between the outputs of 1101 and 1102 to produce a difference signal, or error signal, $\beta^{[i]} = q - R\Gamma^{[i]}\hat{b}^{[i]}$, whose elements are indexed first by base station, and then by users within a base station, $$\underline{\beta}^{[i]} = [\beta_{(0),0}^{[i]}, \ldots, \beta_{(0),K^{(0)}-1}^{[i]} | \ldots | \beta_{(B-1),0}^{[i]}, \ldots, \beta_{(B-1),K^{(B-1)}-1}^{[i]}]^T.$$

Figure 11B:
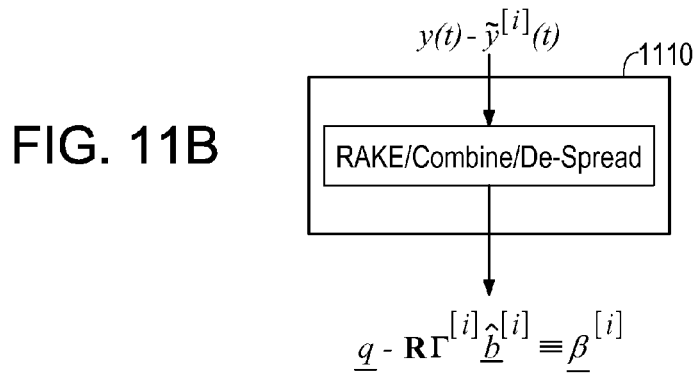
FIG. 11B is a block diagram illustrating how linear functions, such as despreading and generating a difference signal, can be swapped in an alternative embodiment for calculating a stabilizing step size.

Alternatively, since the operations used to produce $\beta^{[i]}$ are linear, a difference signal $y(t) - \hat{y}_{(s)}^{[i]}(t)$ may be produced prior to despreading, such as shown by block 1110 in FIG. 11B.

The norm-square of $\beta^{[i]}$ (i.e., $\|\beta^{[i]}\|^2$) is evaluated 1104 to generate the numerator in Equation 25. The elements of $\beta^{[i]}$ are processed 1105 to produce a synthesized received signal $$\sum_{s=0}^{B-1} \sum_{l=0}^{L-1} \alpha_{(s),l} \sum_{k=0}^{K-1} \beta_{(s),k}^{[i]} u_{(s),k}(t - \tau_{(s),l}),$$

and the norm square of this signal is calculated 1106 to produce the denominator of Equation 25.

Figure 11C:
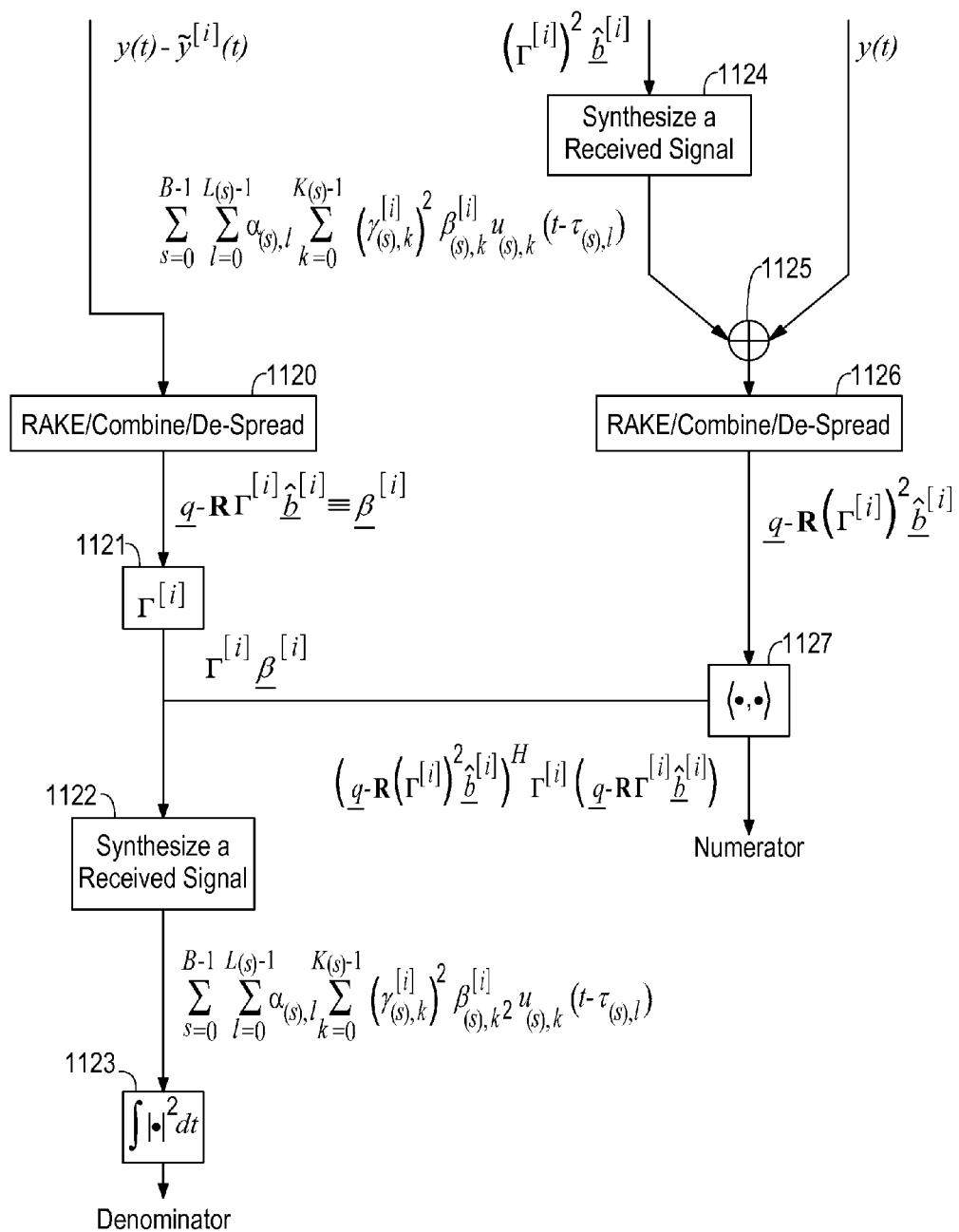
FIG. 11C is a block diagram illustrating another embodiment for implicitly calculating a stabilizing step size.

FIG. 11C is a block diagram of a method and apparatus for implicitly calculating a stabilizing step size for the special case of F=I. In this case, Equation 24 becomes $$\mu^{[i]} = \frac{\left(q - R(\Gamma^{[i]})^2 \hat{\underline{b}}^{[i]}\right)^H \Gamma^{[i]}\left(q - R\Gamma^{[i]}\hat{\underline{b}}^{[i]}\right)}{\left(q - R\Gamma^{[i]}\hat{\underline{b}}^{[i]}\right)^H (\Gamma^{[i]})^H R\Gamma^{[i]}\left(q - R\Gamma^{[i]}\hat{\underline{b}}^{[i]}\right)},$$

Equation 26

The signal $\beta^{[i]}$ is generated by a Rake, maximal ratio combining, and despreading unit 1120 and multiplied 1121 by $\Gamma^{[i]}$ to produce vector $\Gamma^{[i]}\beta^{[i]}$. A synthesis module 1122 processes the vector $\Gamma^{[i]}\beta^{[i]}$ to produce a synthesized receive vector, which is norm-squared 1123 to produce the denominator of Equation 26.

A synthesized received signal is generated 1124 from the vector $(\Gamma^{[i]})^2\beta^{[i]}$ and processed with received signal y(t) by an adder 1125 to produce a difference signal. A Rake/combiner/despreader 1126 processes the difference signal to generate the vector $q - R(\Gamma^{[i]})^2\hat{b}^{[i]}$. The inner product 1127 between this vector and the vector $\Gamma^{[i]}\underline{\beta}^{[i]}$ gives the numerator of Equation 26.

In an alternative embodiment, the stabilizing step size may be derived from the multi path channel gains, $$\mu^{[i]} = \mu = \max\left\{C, \left(\frac{\max_{(s), l} |\alpha_{(s),l}|^p}{\sum_{s=0}^{B-1} \sum_{l=0}^{L_{(s)}-1} |\alpha_{(s),l}|^p}\right)^r\right\},$$

Equation 27 where $\mu^{[i]}$ is fixed for every ICU and C, p and r are non-negative constants.

Figure 12:
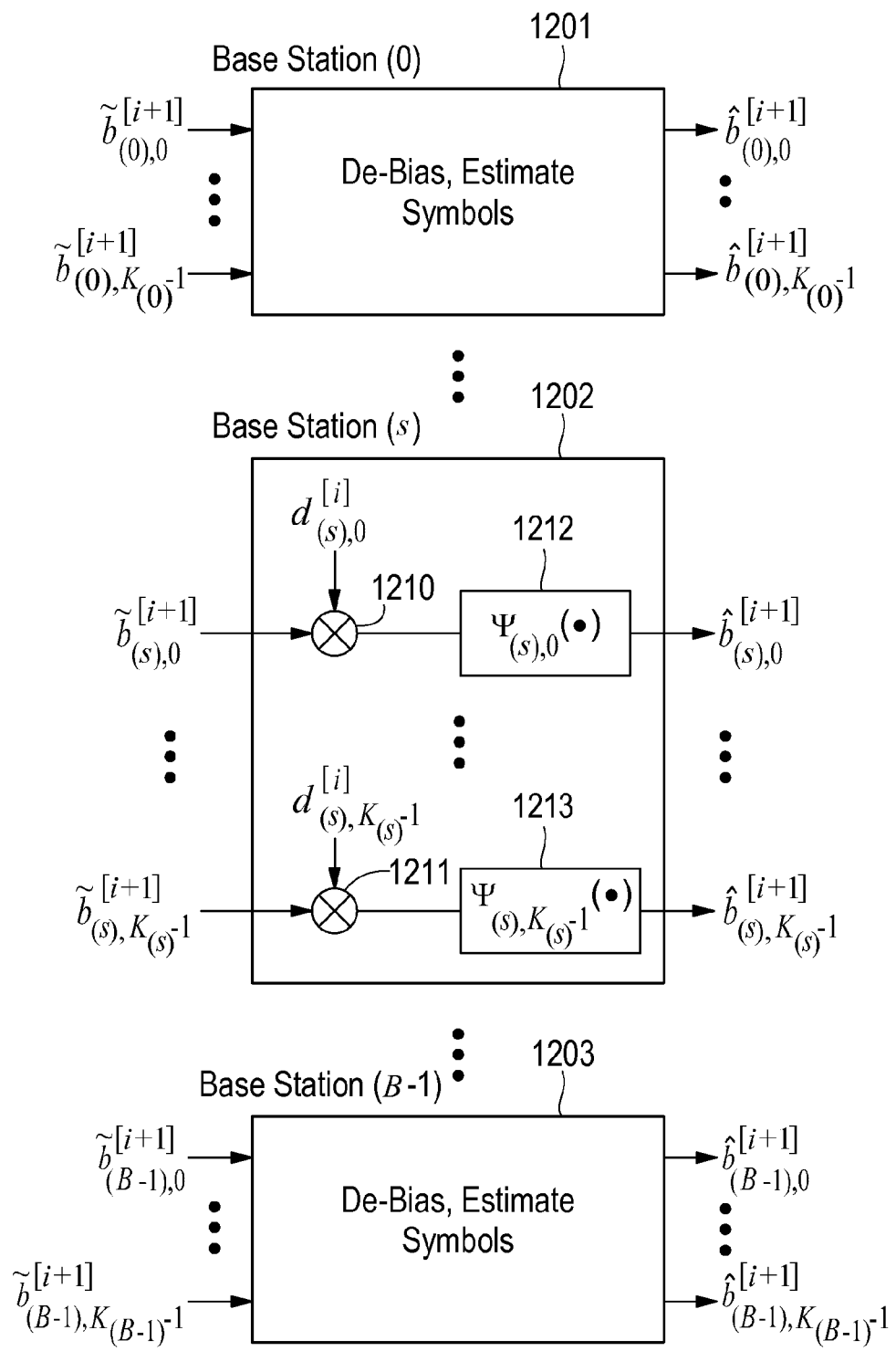
FIG. 12 is a block diagram of a symbol-estimation block in an interference cancellation unit.

FIG. 12 is a block diagram of a symbol-estimation block comprising a plurality B of mixed-decision modules 1201-1203 configured to process signals received from B base stations. Mixed-decision module 1202 shows functionality that is common to all of the mixed-decision modules 1201-1203. De-biasing modules 1210-1211 scale each of a plurality $K_{(s)}$ of input symbol estimates $\tilde{b}_{(s),k}^{[i+1]}$ with a non-negative de-biasing constant $d_{(s),k}^{[i]}$ for producing de-biased input symbol estimates. The mixed-decision module 1202) includes symbol-estimation modules 1212-1213 configured to perform symbol estimation on de-biased input symbol estimates whose constellations are known at the receiver.

The de-biasing constant may be expressed by $$d_{(s),k}^{[i]} = E[|b_{(s),k}|]/E\left[|\tilde{b}_{(s),k}^{[i+1]}|\right]$$ Equation 28

$$d_{(s),k}^{[i]} = \sqrt{E[|b_{(s),k}|^2]/E\left[|\tilde{b}_{(s),k}^{[i+1]}|^2\right]}$$ Equation 29

$d_{(s),k}^{[i]}=1$ if the symbol constellation is unknown   Equation 30 where the statistical expectations may be approximated by time-averaging. De-biasing helps mitigate the "ping-pong" phenomenon often associated with iterative interference cancellation in which the symbol error rate oscillates with respect to iterations. After de-biasing, each value $d_{(s),k}^{[i]}\tilde{b}_{(s),k}^{[i+1]}$ is operated on by a map $\Psi_{(s),k}$ that takes the input into the complex plane to yield the updated symbol estimate $$\hat{b}_{(s),k}^{[i+1]}=\Psi_{(s),k}(d_{(s),k}^{[i]}\tilde{b}_{(s),k}^{[i+1]}).$$ Equation 31

The map $\Psi_{(s),k}$ may be a mixed-decision map, which is a combination of soft and hard decisions. A soft-decision map is provided by a function $\Psi_{(s),k}(x)$ that is a continuous function whose output ranges over the complex plane. Common examples, include, but are not limited to, $$\Psi_{(s),k}^{soft}(x) = \begin{cases} c_{(s),k}x \\ \text{or} \\ c_{(s),k}\left(\tanh(a_{(s),k}\text{Re}\{x\}) + \sqrt{-1}\tanh(a_{(s),k}\text{Im}\{x\})\right) \end{cases}$$ Equation 32 for positive real-valued constants $a_{(s),k}$ and $C_{(s),k}$. The expression Re{●} returns the real part of its argument, and Im{●} returns the imaginary part of its argument. A hard decision map is provided when $\Psi_{(s),k}(x)$ slices the input so that the output is an element from the complex symbol constellation employed by the $k^{th}$ user of base station (s), $$\Psi_{(s),k}^{hard}(x)=\text{slice}(x).$$ Equation 33

The slicer quantizes its argument x to the nearest constellation symbol according to some metric (e.g., Euclidean distance). A hard decision is applicable only to those symbols whose constellations are known to the receiver.

A mixed-decision map $\Psi_{(s),k}^{mixed}(x)$ produces an output that is a soft decision or a hard decision, such as $$\Psi_{(s),k}^{mixed}(x) = \begin{cases} \Psi_{(s),k}^{hard}(x) & \text{if} \quad SINR_{(s),k} > c_{(s),k} \\ \Psi_{(s),k}^{soft}(x) & \text{otherwise} \end{cases}$$ Equation 34

The mixed-decision map $\Psi_{(s),k}^{mixed}(x)$ produces a hard decision if the SINR of a $k^{th}$ user of base station (s) exceeds a threshold $c_{(s),k}$. Otherwise, a soft decision is performed. The SINR may be estimated with a time-averaged error-vector measurement (EVM). Time averaging may cause a block of symbols to share the same SINR estimate.

An alternative mixed-decision map $\Psi_{(s),k}^{mixed}(x)$ may act on individual symbols, $$\Psi_{(s),k}^{mixed}(x) = \begin{cases} \Psi_{(s),k}^{hard}(x) & \text{if} \quad x \in C_{(s),k}(\text{slice}(x)) \\ \Psi_{(s),k}^{soft}(x) & \text{otherwise,} \end{cases}$$ Equation 35 where the constellation space for the symbol of a $k^{th}$ user of base station (s) is partitioned into hard- and soft-decision regions with $c_{(s),k}(b)$ denoting the hard-decision region for a symbol b from that user's constellation. If $x \in C_{(s),k}(b)$, then a hard decision for x is made. One embodiment for defining $c_{(s),k}(b)$ is to include all points within a predetermined distance of b in the constellation space, $$C_{(s),k}(b)=\{x:\text{distance}(x,b)<c_{(s),k}(b)\},$$ Equation 36 where any distance metric may be used (e.g., $|x-b|^p$ for some p>0) and the radii $c_{(s),k}(b)$ over the set of constellation points b are chosen such that the hard-decision regions are non-overlapping. Alternative embodiments of the invention may employ different partitions of the constellation space. For example, edge constellation points may be given unbounded hard-decision regions.

Both the average SINR and instantaneous approaches are applicable to any known constellation; they need not be restricted to BPSK, QPSK, or even QAM. Either of these mixed-decision approaches may be performed with the additional constraint that the receiver knows only the constellation employed for a subset of the active codes. Such situations may arise in EV-DO and HSDPA networks. In such cases, the receiver may use soft decisions for codes employing an unknown modulation. Those skilled in the art will understand that a modulation classification of these codes may be performed, which may be particularly useful in systems wherein all interfering codes share the same unknown constellation.

Figure 13:
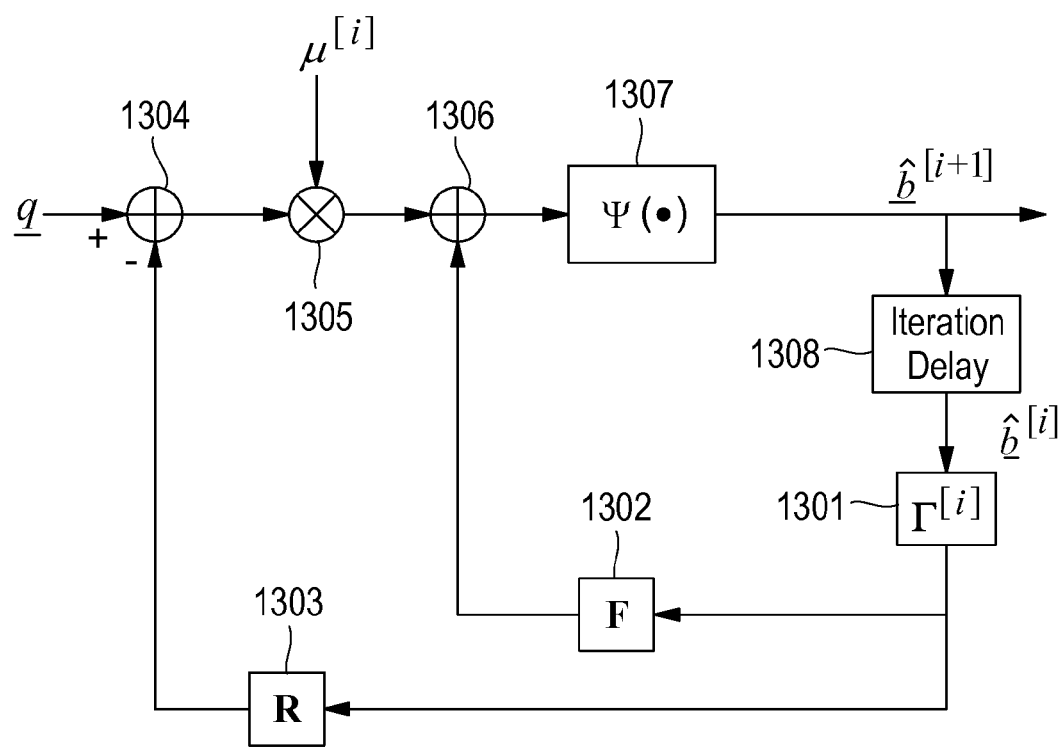
FIG. 13 is a block diagram of a dual feedback algorithm configured for implementing an iterative interference canceller.

The following algorithm, which is illustrated in FIG. 13, demonstrates one embodiment for performing IIC.
Algorithm 1:
Purpose: Estimate the $$K = \sum_{s=0}^{B-1} K_{(s)}$$

symbols in $\hat{b}$.
Notation: The iteration index is represented by a superscript [i]; i=−1 is the initialization; i=0 corresponds to the output of the front-end processor; and i>0 corresponds to the i-th ICU.

DEFINITIONS b in Equation 22
$\hat{b}^{[i]}$ is in Equation 31
$\bar{q}$ is in Equation 17
$\bar{R}$ is in Equation 19
F is I or as in Equation 21
$\Gamma^{[i]}$ is in Equation 14 with elements defined in Equation 3-Equation 5
$\mu^{[i]}$ is defined in Equation 23-Equation 27
$\Psi$ maps each argument to a complex number to implement de-biasing as
in Equation 28-Equation 30 and then symbol estimation as in Equation 32-Equation 36
Initializations: $\hat{b}^{[-1]}=0$, a K×1 zero vector
Iterations: Index i=−1, 0, 1, ... M−1 where M is the number of times to iterate the succeeding update equation $$\hat{b}^{[i+1]}=\Psi\{\mu^{[i]}(\bar{q}-\bar{R}\Gamma^{[i]}\hat{b}^{[i]})+F\Gamma^{[i]}\hat{b}^{[i]}\}$$ Update Equation Output: $\hat{b}=\hat{b}^{[M]}$, the symbol estimates after M iterations of the update equation.

FIG. 13 shows an internal feedback loop comprising operations 1308, 1301, 1302, 1306, and an external feedback loop comprising operations 1308, 1301, 1303, and 1304. The output of the external feedback loop $q-R\Gamma^{[t]}\hat{b}^{[t]}$, which is multiplicatively scaled 1305 by $\mu^{[t]}$. The scaled output is combined 1306 with the internal feedback loop to yield $(q-R\Gamma^{[t]}\hat{b}^{[t]})+F\Gamma^{[t]}\hat{b}^{[t]}$, which is processed by a symbol estimator 1307 and fed to the iteration delay 1308 that begins the internal and external loops.

Although embodiments of the invention are described with respect to forward-link channels, embodiments may be configured to operate in reverse-link channels. In the reverse link, different users' transmissions experience different multipath channels, which requires appropriate modifications to Rake processing and signal synthesis. For example, a front-end processor may incorporate one Rake for every user in every base station rather than a single Rake per base station. Similarly, a separate multipath channel emulator may be employed for imparting multipath delays and gains to each user's signal. Accordingly, the number of constituent finger signals will equal the sum over the number of multipath fingers per user per base station, rather than the sum over the number of multipath fingers per base station.

It is clear that this algorithm may be realized in hardware or software and there are several modifications that can be made to the order of operations and structural flow of the processing.

Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g., a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. An interference suppressor for suppressing interference in a received signal from a channel, the suppressor configured for performing at least one iteration to produce at least one interference-suppressed symbol estimate, the suppressor comprising:
   a synthesizing module configured to synthesize one or more constituent signals corresponding to one or more sources in the channel from a plurality of symbol estimates, and to produce a combined signal therefrom;
   a subtraction module configured to subtract the combined signal from the received signal to produce an error signal; and
   a stabilizing step size module configured to scale the error signal by a stabilizing step size to produce a scaled error signal.

2. The suppressor recited in claim 1, wherein the one or more sources in the channel correspond to one or more users.

3. The suppressor recited in claim 1, wherein the one or more sources in the channel correspond to one or more fingers.

4. The suppressor recited in claim 1, wherein the synthesizing module comprises a Walsh coder and a pseudo-noise (PN) coder.

5. An interference suppressor for suppressing interference in a received signal from a channel, the suppressor configured for performing at least one iteration to produce at least one interference-suppressed symbol estimate, the suppressor comprising:
   a synthesizing module configured to synthesize one or more constituent signals corresponding to one or more sources in the channel from a plurality of symbol estimates, and to produce a combined signal therefrom;
   a subtraction module configured to subtract the combined signal from the received signal to produce an error signal; and
   a weighting module configured to multiply input symbol estimates by weights having magnitudes derived from merits of the input symbol estimates.

6. The suppressor recited in claim 1, further comprising a combining module configured for adding at least one of the constituent signals to the scaled error signal to produce one or more interference-suppressed signals.

7. An interference suppressor for suppressing interference in a received signal from a channel, the suppressor configured for performing at least one iteration to produce at least one interference-suppressed symbol estimate, the suppressor comprising:
- a synthesizing module configured to synthesize one or more constituent signals corresponding to one or more sources in the channel from a plurality of symbol estimates, and to produce a combined signal therefrom; and
- a subtraction module configured to subtract the combined signal from the received signal to produce an error signal;
- wherein the constituent signals are characterized by at least one of a set of signals, the set comprising received signals associated with a plurality of Rake fingers and received signals associated with a plurality of symbol sources.

8. The suppressor recited in claim 1, further configured for performing iterative interference suppression in a receiver, wherein the synthesizing module is configured to synthesize the constituent signals to approximate estimated received signals employing the constituent signals for each of the sources in the channel and the plurality of symbol estimates.

9. The suppressor recited in claim 8, wherein the synthesizing module is configured to synthesize a subset of the sources for producing the combined signal.

10. The suppressor recited in claim 1, further comprising a resolving module configured to resolve the scaled error signal into one or more constituent error signals corresponding to each of the sources in the channel to produce one or more resolved error signals, and a combining module configured to combine the one or more resolved error signals with the weighted input symbol estimates to produce one or more interference-suppressed symbol estimates.

11. The suppressor recited in claim 10, wherein the resolving module resolves the interference-suppressed symbol estimates onto one or more user code waveforms.

12. The suppressor recited in claim 1, wherein the stabilizing step size module is configured to produce a scalar stabilizing step size for improving convergence of a plurality of iterations.

13. An interference suppressor for suppressing interference in a received signal from a channel, the suppressor configured for performing at least one iteration to produce at least one interference-suppressed symbol estimate, the suppressor comprising:
- a synthesizing module configured to synthesize one or more constituent signals corresponding to one or more sources in the channel from a plurality of symbol estimates, and to produce a combined signal therefrom;
- a subtraction module configured to subtract the combined signal from the received signal to produce an error signal; and
- a decision module configured to produce a decision for at least one of the symbol estimates, the decision selected from one of a hard decision quantizing at least one of the symbol estimates to a nearby constellation point, and a soft decision, scaling, but not quantizing, the at least one of the symbol estimates.

14. The suppressor recited in claim 13, wherein the decision module comprises a de-bias module configured to remove bias, as computed on the symbol estimates, before performing the decision.

15. An interference suppressor for suppressing interference in a received signal from a channel, the suppressor configured for performing at least one iteration to produce at least one interference-suppressed symbol estimate, the suppressor comprising:
- a synthesizing module configured to synthesize one or more constituent signals corresponding to one or more sources in the channel from a plurality of symbol estimates, and to produce a combined signal therefrom; and
- a subtraction module configured to subtract the combined signal from the received signal to produce an error signal;
- wherein the suppressor is configured for performing synthesis and resolution into one or more constituent signals corresponding to each of the sources in the channel in an outer feedback loop, and updating symbol estimates in an inner feedback loop employing an implementation matrix.

16. The suppressor recited in claim 15, wherein synthesis and resolution comprise constructing the one or more constituent signals from source, channel, and receiver effects.

17. The suppressor recited in claim 15, wherein the implementation matrix comprises one of an identity matrix and a transmit-signal correlation matrix.

18. The suppressor recited in claim 1, configured to reside in at least one of a set of devices, the set comprising a subscriber-side device configured for processing forward-link signals, and a server-side device for processing reverse-link signals.

19. An interference suppressor for suppressing interference in a received signal from a channel, the suppressor configured for performing at least one iteration to produce at least one interference-suppressed symbol estimate, the suppressor comprising:
- a synthesizing module configured to synthesize one or more constituent signals corresponding to one or more sources in the channel from a plurality of symbol estimates, and to produce a combined signal therefrom; and
- a subtraction module configured to subtract the combined signal from the received signal to produce an error signal;
- wherein the suppressor is configured for performing symbol-level interference suppression on despread signals with a one-step matrix update equation expressing a representation of user correlations, an implementation matrix, a soft-weighting matrix, a de-biasing matrix, and a scalar stabilizing step size.

20. The suppressor recited in claim 19, wherein the one-step matrix update equation is expressed by $$\hat{\underline{b}}^{[i+1]} = \Psi\{D^{[i]}(\mu^{[i]}(\underline{q} - R\Gamma^{[i]}\hat{\underline{b}}^{[i]}) + F\Gamma^{[i]}\hat{\underline{b}}^{[i]})\},$$

wherein $\hat{\underline{b}}^{[i]}$ is a column vector containing the input symbol estimates after an $i^{th}$ iteration of interference suppression, $\underline{q}$ is a vector of the despread received signal, $\mu^{[i]}$ is a scalar stabilizing step, $\Gamma^{[i]}$ is a weighting matrix used for scaling the input symbol estimates, R is a received-signal correlation matrix, F is an implementation matrix, $D^{[i]}$ is a de-biasing matrix, and $\Psi$ returns a mixed (hard- or soft-) decision for each element of its input vector to produce the plurality of updated symbol estimates $\hat{\underline{b}}^{[i+1]}$.

21. The suppressor recited in claim 1, configured as an internal feedback loop and an external feedback loop;
- the external feedback loop configured to multiply a vector of the input symbol estimates by a weighting matrix and a users' received correlation matrix to produce an external-feedback vector, and subtracting the external-feedback vector from the despread signal vector for producing a difference error vector that is scaled by a scalar stabilizing step size; and the internal feedback loop configured to multiply a vector of the plurality of weighted symbol estimates by an implementation matrix to produce an internal-feedback vector, the internal-feedback vector being summed with a vector derived from the scaled error signal.

22. The suppressor recited in claim 21, wherein
the external feedback loop is configured to multiply the input symbol estimate, $\hat{b}^{[i]}$, by both the weighting matrix $\Gamma^{[i]}$ and the users' received correlation matrix R to produce the external-feedback vector, $R\Gamma^{[i]}\hat{\underline{b}}^{[i]}$, which is subtracted from the despread signal vector $\underline{q}$ in order to produce the difference error vector, $\underline{q}-R\Gamma^{[i]}\hat{\underline{b}}^{[i]}$; and
the internal feedback loop is configured to multiply the weighted symbol estimates, $\Gamma^{[i]}\hat{b}$, by the implementation matrix F to produce the internal-feedback vector, $F\Gamma^{[i]}\hat{b}^{[i]}$, which is summed with the difference error vector produced by the external feedback loop, $\underline{q}-R\Gamma^{[i]}\hat{\underline{b}}^{[i]}$, that has been scaled by the stabilizing step size) $\mu^{[i]}$, to produce $F\Gamma^{[i]}\hat{b}^{[i]}(\underline{q}-R^{[i]}\hat{\underline{b}}^{[i]})$.

23. An interference suppression method for suppressing interference in a received signal from a channel, the method configured for performing at least one iteration to produce an interference-suppressed symbol estimate, the method comprising:
configuring a processor to
synthesize one or more constituent signals corresponding to one or more sources in the channel from a plurality of symbol estimates;
produce a combined signal therefrom;
subtract the combined signal from the received signal to produce an error signal; and
scale the error signal by a stabilizing step size to produce a scaled error signal.

24. The method recited in claim 23, wherein the one or more sources in the channel correspond to one or more users.

25. The method recited in claim 23, wherein the one or more sources in the channel correspond to one or more fingers.

26. The method recited in claim 23, wherein the constituent signals are synthesized using a Walsh coder and a pseudo-noise (PN) coder.

27. The method recited in claim 23, wherein the processor is further configured for suppressing at least one of intra-cell interference and inter-cell interference.

28. An interference suppression method for suppressing interference in a received signal from a channel, the method configured for performing at least one iteration to produce an interference-suppressed symbol estimate, the method comprising:
configuring a processor to
synthesize one or more constituent signals corresponding to one or more sources in the channel from a plurality of symbol estimates;
produce a combined signal therefrom;
subtract the combined signal from the received signal to produce an error signal; and
weight by multiplying input symbol estimates by weights having magnitudes derived from merits of the symbol estimates.

29. The method recited in claim 23, wherein the processor is further configured for adding the constituent signals to the scaled error signal to produce one or more interference-suppressed signals.

30. An interference suppression method for suppressing interference in a received signal from a channel, the method configured for performing at least one iteration to produce an interference-suppressed symbol estimate, the method comprising:
configuring a processor to
synthesize one or more constituent signals corresponding to one or more sources in the channel from a plurality of symbol estimates;
produce a combined signal therefrom; and
subtract the combined signal from the received signal to produce an error signal;
wherein the constituent signals are characterized by at least one of a set of signals, the set comprising received signals associated with a plurality of Rake fingers and received signals associated with a plurality of symbol sources.

31. The method recited in claim 23, further configured for performing iterative interference suppression in a receiver, wherein the processor is further configured to synthesize the constituent signals to approximate estimated received signals employing the constituent signals for each of the sources in the channel and the plurality of symbol estimates.

32. The method recited in claim 31, wherein the processor is further configured to synthesize a subset of the sources for producing the combined signal.

33. The method recited in claim 23, wherein the processor is further configured to resolve the scaled error signal onto one or more constituent signals corresponding to each of the sources in the channel to produce a resolved error signal, and to combine the resolved error signal with the input symbol estimates to produce the interference-suppressed symbol estimates.

34. The method recited in claim 33, wherein configuring the processor to resolve comprises configuring the processor to resolve the interference-suppressed symbol estimates onto one or more user code waveforms.

35. The method recited in claim 23, wherein the processor is further configured to produce a scalar stabilizing step size for improving convergence of a plurality of iterations.

36. An interference suppression method for suppressing interference in a received signal from a channel, the method configured for performing at least one iteration to produce an interference-suppressed symbol estimate, the method comprising:
configuring a processor to
synthesize one or more constituent signals corresponding to one or more sources in the channel from a plurality of symbol estimates;
produce a combined signal therefrom;
subtract the combined signal from the received signal to produce an error signal;
produce a decision for at least one of the symbol estimates, the decision selected from one of a hard decision quantizing at least one of the symbol estimates to a nearby constellation point, and a soft decision, scaling, but not quantizing, the at least one of the symbol estimates.

37. The method recited in claim 35, wherein producing a decision comprises removing bias computed on the symbol estimates before producing the decision.

38. An interference suppression method for suppressing interference in a received signal from a channel, the method configured for performing at least one iteration to produce an interference-suppressed symbol estimate, the method comprising:
configuring a processor to
synthesize one or more constituent signals corresponding to one or more sources in the channel from a plurality of symbol estimates;

produce a combined signal therefrom;
subtract the combined signal from the received signal to produce an error signal;
perform synthesis and resolution onto one or more constituent signals corresponding to each of the sources in the channel in an outer feedback loop, and update symbol estimates in an inner feedback loop employing an implementation matrix.

39. The method recited in claim 38, wherein configuring a processor to performing synthesis and resolution comprises configuring a processor to construct the one or more constituent signals from source, channel, and receiver effects.

40. The method recited in claim 38, wherein the implementation matrix comprises one of an identity matrix and a transmit-signal correlation matrix.

41. The method recited in claim 23, wherein the processor is further configured to reside in at least one of a set of devices, the set comprising a subscriber-side device configured for processing forward-link signals, and a server-side device for processing reverse-link signals.

42. An interference suppression method for suppressing interference in a received signal from a channel, the method configured for performing at least one iteration to produce an interference-suppressed symbol estimate, the method comprising:
configuring a processor to
synthesize one or more constituent signals corresponding to one or more sources in the channel from a plurality of symbol estimates;
produce a combined signal therefrom;
subtract the combined signal from the received signal to produce an error signal; and
perform symbol-level interference suppression on despread signals with a one-step matrix update equation expressing a representation of user correlations, an implementation matrix, a soft-weighting matrix, a de-biasing matrix, and a scalar stabilizing step size.

43. The method recited in claim 42, wherein the one-step matrix update equation is expressed by $$\hat{\underline{b}}^{[i+1]} = \Psi\{D^{[i]}(\mu^{[i]}(\underline{q} - R\Gamma^{[i]}\hat{\underline{b}}^{[i]}) + F\Gamma^{[i]}\hat{\underline{b}}^{[i]})\},$$

wherein $\hat{\underline{b}}^{[i]}$ is a column vector containing the input symbol estimates after an $i^{th}$ iteration of interference suppression, $\underline{q}$ is a vector of the despread received signal, $\mu^{[i]}$ is a scalar stabilizing step, $\Gamma^{[i]}$ is a weighting matrix used for scaling the input symbol estimates, R is a received-signal correlation matrix, F is an implementation matrix, $D^{[i]}$ is a de-biasing matrix, and $\Psi$ returns a mixed (hard- or soft-) decision for each element of its input vector to produce the plurality of updated symbol estimates $\hat{\underline{b}}^{[i+1]}$.

44. The method recited in claim 23, wherein the processor is further configured for employing an internal feedback loop process and an external feedback loop process;
the external feedback loop process comprising multiplying a vector of the input symbol estimates by a weighting matrix and a users' received correlation matrix to produce an external-feedback vector, and subtracting the external-feedback vector from the despread signal vector for producing a difference error vector that is scaled by a scalar stabilizing step size; and
the internal feedback loop process comprising multiplying a vector of the plurality of weighted symbol estimates by an implementation matrix to produce an internal-feedback vector, and summing the internal-feedback vector with a vector derived from the scaled error signal.

45. The method recited in claim 44, wherein the external feedback loop process comprises multiplying the input symbol estimate, $\hat{\underline{b}}^{[i]}$, by both the weighting matrix $\Gamma^{[i]}$ and the users' received correlation matrix R to produce the external-feedback vector, $R\Gamma^{[i]}\hat{\underline{b}}^{[i]}$, which is subtracted from the despread signal vector $\underline{q}$ in order to produce the difference error vector, $\underline{q} - R\Gamma^{[i]}\hat{\underline{b}}^{[i]}$; and
the internal feedback loop process comprising multiplying the weighted symbol estimates, $\Gamma^{[i]}\hat{\underline{b}}^{[i]}$, by the implementation matrix F to produce the internal-feedback vector, $F\Gamma^{[i]}\hat{\underline{b}}^{[i]}$, and summing the internal-feedback vector with the difference error vector produced by the external feedback loop process, $\underline{q} - R\Gamma^{[i]}\hat{\underline{b}}^{[i]}$, that has been scaled by the stabilizing step size $\mu^{[i]}$, to produce $F\Gamma^{[i]}\hat{\underline{b}}^{[i]} + \mu^{[i]}(\underline{q} - R\Gamma^{[i]}\hat{\underline{b}}^{[i]})$.

46. An interference suppression system for suppressing interference in a received signal from a channel, the system configured for performing at least one iteration to produce an interference-suppressed symbol estimate, the system comprising:
a synthesizing means configured to synthesize one or more constituent signals corresponding to one or more sources in the channel from a plurality of symbol estimates, and producing a combined signal therefrom;
a subtraction means configured to subtract the combined signal from the received signal to produce an error signal; and
a stabilizing step size means configured for scaling the error signal by a stabilizing step size to produce a scaled error signal.

47. The system recited in claim 46, wherein the one or more sources in the channel correspond to one or more users.

48. The system recited in claim 46, wherein the one or more sources in the channel correspond to one or more fingers.

49. The system recited in claim 46, wherein the synthesizing means comprises a Walsh coder and a pseudo-noise (PN) coder.

50. An interference suppression system for suppressing interference in a received signal from a channel, the system configured for performing at least one iteration to produce an interference-suppressed symbol estimate, the system comprising:
a synthesizing means configured to synthesize one or more constituent signals corresponding to one or more sources in the channel from a plurality of symbol estimates, and producing a combined signal therefrom;
a subtraction means configured to subtract the combined signal from the received signal to produce an error signal; and
a weighting means configured to multiply input symbol estimates by weights having magnitudes derived from merits of the one or more symbol estimates.

51. The system recited in claim 46, further comprising a combining means configured for adding the constituent signals to the scaled error signal to produce one or more interference-suppressed signals.

52. The system recited in claim 46, wherein the constituent signals are characterized by at least one of a set of signals, the set comprising received signals associated with a plurality of Rake fingers and received signals associated with a plurality of symbol sources.

53. The system recited in claim 46, further configured for performing iterative interference suppression in a receiver, wherein the synthesizing means is configured to synthesize the constituent signals corresponding to each of the one or more sources in the channel to approximate estimated received signals employing the constituent signals for each of the sources in the channel and the plurality of symbol estimates.

54. The system recited in claim 53, wherein the synthesizing means is configured to synthesize a subset of the sources for producing the combined signal.

55. The system recited in claim 46, further comprising a resolving means configured to resolve the scaled error signal onto one or more constituent signals corresponding to one or more sources in the channel to produce a resolved error signal, and a combining means configured to combine the resolved error signal with the weighted input symbol estimates to produce the interference-suppressed symbol estimates.

56. The system recited in claim 55, wherein the resolving means is further configured to resolve the interference-suppressed symbol estimates onto one or more user code waveforms.

57. The system recited in claim 46, wherein the stabilizing step size means is configured to produce a scalar stabilizing step size for improving convergence of a plurality of iterations.

58. The system recited in claim 46, further comprising a decision means configured to produce a decision for at least one of the symbol estimates, the decision selected from one of a hard decision quantizing at least one of the symbol estimates to a nearby constellation point, and a soft decision, scaling, but not quantizing, the at least one of the symbol estimates.

59. The system recited in claim 58, wherein the decision means comprises a de-biasing means configured to remove bias, as computed on the symbol estimates, before producing the decision.

60. The system recited in claim 46, configured for performing synthesis and resolution onto one or more constituent signals corresponding to one or more sources in the channel in an outer feedback loop, and updating symbol estimates in an inner feedback loop employing an implementation matrix.

61. The system recited in claim 60, wherein synthesis and resolution comprise constructing the one or more constituent signals from source, channel, and receiver effects.

62. The system recited in claim 60, wherein the implementation matrix comprises one of an identity matrix and a transmit-signal correlation matrix.

63. The system recited in claim 46, configured to reside in at least one of a set of devices, the set comprising a subscriber-side device configured for processing forward-link signals, and a server-side device for processing reverse-link signals.

64. The system recited in claim 46, configured for performing symbol-level interference suppression on despread signals with a one-step matrix update equation expressing a representation of user correlations, an implementation matrix, a soft-weighting matrix, a de-biasing matrix, and a scalar stabilizing step size.

65. The system recited in claim 64, wherein the one-step matrix update equation is expressed by $$\hat{b}^{[i+1]} = \Psi\{D^{[i]}(\mu^{[i]}(\underline{q} - R\Gamma^{[i]}\hat{\underline{b}}^{[i]}) + F\Gamma^{[i]}\hat{\underline{b}}^{[i]})\},$$

wherein $\hat{b}^{[i]}$ is a column vector containing the input symbol estimates after an $i^{th}$ iteration of interference suppression, q is a vector of the despread received signal, $\mu^{[i]}$ is a scalar stabilizing step, $\Gamma^{[i]}$ is a weighting matrix used for scaling the input symbol estimates, R is a received-signal correlation matrix, F is an implementation matrix, $D^{[i]}$ is a de-biasing matrix, and $\Psi$ returns a mixed (hard- or soft-) decision for each element of its input vector to produce the plurality of updated symbol estimates $\hat{b}^{[i+1]}$.

66. The system recited in claim 46, configured as an internal feedback loop and an external feedback loop;
the external feedback loop configured to multiply a vector of the input symbol estimates by a weighting matrix and a users' received correlation matrix to produce an external-feedback vector, and subtracting the external-feedback vector from the despread signal vector for producing a difference error vector that is scaled by a scalar stabilizing step size; and
the internal feedback loop configured to multiply a vector of the plurality of weighted symbol estimates by an implementation matrix to produce an internal-feedback vector, the internal-feedback vector being summed with a vector derived from the scaled error signal.

67. The system recited in claim 66, wherein
the external feedback loop is configured to multiply the input symbol estimate, $\hat{b}^{[i]}$, by both the weighting matrix $\Gamma^{[i]}$ and the users' received correlation matrix R to produce the external-feedback vector, $R\Gamma^{[i]}\hat{\underline{b}}^{[i]}$, which is subtracted from the despread signal vector $\underline{q}$ in order to produce the difference error vector, $\underline{q} - R\Gamma^{[i]}\hat{\underline{b}}^{[i]}$; and
the internal feedback loop is configured to multiply the weighted symbol estimates, $\Gamma^{[i]}\hat{\underline{b}}^{[i]}$, by the implementation matrix F to produce the internal-feedback vector, $F\Gamma^{[i]}\hat{\underline{b}}^{[i]}$, which is summed with the difference error vector produced by the external feedback loop, $\underline{q} - R\Gamma^{[i]}\hat{\underline{b}}^{[i]}$, that has been scaled by the stabilizing step size $\mu^{[i]}$, to produce $F\Gamma^{[i]}\hat{\underline{b}}^{[i]} + \mu^{[i]}(\underline{q} - R\Gamma^{[i]}\hat{\underline{b}}^{[i]})$.

* * * * *